(12) United States Patent
Katou et al.

(10) Patent No.: US 7,931,551 B2
(45) Date of Patent: Apr. 26, 2011

(54) HYDRAULIC CONTROL APPARATUS AND METHOD FOR BELT-TYPE CONTINUOUSLY-VARIABLE TRANSMISSION

(75) Inventors: Yoshiaki Katou, Kanagawa (JP); Masanori Yamazaki, Kanagawa (JP)

(73) Assignee: JATCO Ltd, Fuji-shi ( * ) Notice: Subject to any disclaimer, the term of this patent is extended or adjusted under 35 U.S.C. 154(b) by 579 days.

(21) Appl. No.: 11/723,182

(22) Filed: Mar. 16, 2007

(65) Prior Publication Data
US 2007/0232423 A1    Oct. 4, 2007

(30) Foreign Application Priority Data

Mar. 17, 2006  (JP) ................................. 2006-074960
Feb. 14, 2007  (JP) ................................. 2007-032819

(51) Int. Cl.
*F16H 61/00*   (2006.01)
(52) U.S. Cl. .......................................... 474/28; 474/18
(58) Field of Classification Search ................ 474/8, 18, 474/28
See application file for complete search history.

(56) References Cited

U.S. PATENT DOCUMENTS

| | | | | |
|---|---|---|---|---|
| 5,025,686 A | * | 6/1991 | Sato et al. | 477/44 |
| 7,169,070 B2 | * | 1/2007 | Jozaki et al. | 474/28 |
| 2007/0082769 A1 | * | 4/2007 | Nihei et al. | 474/8 |

FOREIGN PATENT DOCUMENTS
WO    WO 2007013792 A1 *  2/2007

OTHER PUBLICATIONS

Atsushi Fujikawa et al.(Honda R&D Co. Ltd.), "Hydraulic and Electronic Control System of CVT for Hybrid Vehicle", Spring Congress of Automotive Engineering Exposition, May 2000, No. 67-00, pp. 1-5.
Kazuhiko Sugano et al., "Development of New-Generation Belt CVT's with High Torque Capacity for Front-Drive Cars", Jun. 2003, No. 4, JATCO Technical Review, Japan, pp. 17-31.

* cited by examiner

*Primary Examiner* — Robert A Siconolfi
*Assistant Examiner* — Anna Momper
(74) *Attorney, Agent, or Firm* — Foley & Lardner LLP

(57) ABSTRACT

A hydraulic control apparatus includes a continuously-variable transmission; a line-pressure control section configured to produce a line pressure by adjusting a discharge pressure of an oil pump; a first hydraulic-pressure control section configured to adjust a first hydraulic pressure based on the line pressure, the first hydraulic pressure being supplied to the drive pulleys; and a second hydraulic-pressure control section configured to adjust a second hydraulic pressure based on the line pressure, the second hydraulic pressure being supplied to the driven pulleys. The continuously-variable transmission includes a pair of drive pulleys including a first movable pulley and a first fixed pulley; a pair of driven pulleys including a second movable pulley and a second fixed pulley; and a belt wound between the pair of drive pulleys and the pair of driven pulleys. The line-pressure control section is configured to adjust the line pressure to a value set by adding a margin pressure to higher one of the first hydraulic pressure and the second hydraulic-pressure, and configured to reduce the margin pressure when the first hydraulic pressure is higher than the second hydraulic pressure.

19 Claims, 22 Drawing Sheets

HYDRAULIC CONTROL APPARATUS AND METHOD FOR BELT-TYPE CONTINUOUSLY-VARIABLE TRANSMISSION

BACKGROUND OF THE INVENTION

The present invention relates to hydraulic control apparatus and method for a belt-type continuously-variable transmission, more particularly to line pressure control apparatus and method.

A Summary Preprint for SPRING CONGRESS of AUTOMOTIVE ENGINEERING EXPOSITION (20005220) discloses one hydraulic control apparatus for a belt-type continuously-variable transmission (hereinafter, CVT). In this technical document, a system is disclosed in which hydraulic pressure for being supplied to a primary pulley (hereinafter, primary pressure Pp) and/or hydraulic pressure for being supplied to a secondary pulley (hereinafter, secondary pressure Ps) are directly controlled by solenoids, as a control system for a belt-catching (belt-sandwiching) pressure namely a pulley thrust (hereinafter, Fz) at the time of a shift of CVT. Further in this document, a line pressure control apparatus is disclosed in which a line pressure (hereinafter, PL) is set by adding a predetermined margin pressure to the higher one of primary pulley pressure Pp and secondary pulley pressure Ps. On the other hand, a JATCO Technical Review (2003 No. 4 pages 17-30) discloses another hydraulic control apparatus for CVT. In this technical document, a system is disclosed in which primary pulley pressure Pp and/or secondary pulley pressure Ps are controlled by a step motor, as the control system for the belt-catching pressure (pulley thrust Fz) at the time of the shift of CVT. Further in this document, a line pressure control apparatus is disclosed in which line pressure PL serving as a base pressure for each hydraulic pressure for being supplied to the corresponding pulley (hereinafter, pulley pressure) is adjusted by a pressure regulator valve so as to keep line pressure PL highest among these three pressures PL, Pp, and Ps.

Thus in these documents, line pressure PL is always set at a pressure level higher than primary and secondary pulley pressures by margins. This setting is conducted in order to secure pulley pressures Pp and Ps capable of reliably preventing a belt slip, assuming that a pressure loss (drop) might occur due to an oil-passage resistance and the like between line pressure PL and pulley pressures Pp and Ps. The belt slip means a state where the belt is slipping against the pulley due to a shortage of the belt-catching pressure (pulley thrust Fz) relative to a torque to be transmitted.

For example, in the case where a transmission ratio Ip (=Rs/Rp) calculated by dividing a belt winding radius Rs on secondary pulley side by a belt winding radius Rp on primary pulley side is greater than 1, namely when transmission ratio (pulley ratio) Ip is in a Low side; belt winding radius Rp on primary pulley side is relatively small (Rp<Rs). From the following reasons; although primary-pulley thrust Fzp is smaller than secondary-pulley thrust Fzs in the Low side of transmission ratio Ip, the difference between Fzp and Fzs is a slight amount.

Namely as a first reason, a pulley thrust (hereinafter, denoted by Fz1) necessary to maintain the belt winding radius R requires lower amount as belt winding radius R becomes smaller. Hence, this pulley thrust Fzp1 of primary pulley side becomes smaller than a pulley thrust Fzs1 of secondary pulley side as belt winding radius Rp of primary pulley side becomes smaller (in other words, as belt winding radius Rs of secondary pulley side becomes larger).

As a second reason, a pulley thrust (hereinafter, denoted by Fz2) necessary to transmit a predetermined torque requires larger amount as belt winding radius R becomes smaller. Hence, this pulley thrust Fzp2 of primary pulley side becomes larger than a pulley thrust Fzs2 of secondary pulley side as belt winding radius Rp of primary pulley side becomes smaller (in other words, as belt winding radius Rs of secondary pulley side becomes larger).

Therefore, when considering a sum of Fz1 and Fz2, the difference between a sum Fzp (=Fzp1+Fzp2) of primary pulley side and a sum Fzs (=Fzs1+Fzs2) of secondary pulley side is small. Note that an upper limit of Fzp2 is suppressed, and hence Fzp scarcely becomes higher than Fzs in the Low side of transmission ratio Ip.

Accordingly in the Low side, secondary pressure Ps higher than primary pressure Pp is needed. Hence, line pressure PL needs to be made at least equal to or higher than secondary pressure Ps.

On the other hand, there is a fear that the belt slip is caused in the primary pulley side whose belt winding radius R is relatively small. Hence, line pressure PL having a predetermined safety factor (safety margin) relative to primary pressure Pp also needs to be set in order to prevent the belt slip.

As mentioned above, primary pressure Pp is close to secondary pressure Ps in the Low side. Therefore, in the case where the safety factor of line pressure PL which is secured against primary pressure Pp is greater than the differential pressure between Pp and Ps; line pressure PL is set to have a predetermined margin pressure also against secondary pressure Ps as a result.

SUMMARY OF THE INVENTION

Next, in the case where the transmission ratio Ip calculated by dividing the belt winding radius on secondary pulley side by the belt winding radius on primary pulley side is smaller than 1, namely the transmission ratio Ip is in an overdrive (High) side; belt winding radius Rs on secondary pulley side is relatively small (Rp>Rs).

Since the state in overdrive side corresponds to a reversed state of the state in Low side of Ip, the difference between primary-pulley thrust Fzp (=Fzp1+Fzp2) and secondary-pulley thrust Fzs (=Fzs1+Fzs2) is expected to be small from the above-mentioned first and second reasons. Moreover, Fzp is expected to scarcely fall below Fzs.

In the Low side, both of an element pressing force (compression force) of the belt and a band tension difference of the belt contribute to the torque transmission (torque transfer). However, in the overdrive side, the band tension difference negatively acts on the torque transmission. Hence in the overdrive side, a further element pressing force for canceling the negatively-acting band tension difference is necessary. Therefore, a clamping force Fz2' additionally necessary to secure the above-mentioned element pressing force requires a larger amount in primary pulley side than in secondary pulley side (Fzp2'>Fzs2').

Accordingly, Fzp (=Fzp1+Fzp2+Fzp2') does not become below Fzs (=Fzs1+Fzs2+Fzs2'), and the difference between Fzp on primary pulley side and Fzs on secondary pulley side is relatively large.

Accordingly in the overdrive side, primary pressure Pp higher than secondary pressure Ps is needed. Hence, line pressure PL needs to be set at least equal to or higher than primary pressure Pp.

On the other hand, there is a fear that the belt slip is caused in the secondary pulley side whose belt winding radius R is relatively small. Hence, line pressure PL having a predetermined safety factor (safety margin) relative to secondary pressure Ps also needs to be set in order to prevent the belt slip.

In the overdrive side, secondary pressure Ps is lower than primary pressure Pp since Fzs is sufficiently small as compared with Fzp, as mentioned above. Moreover, its differential pressure (Pp−Ps) is large. Accordingly, the safety factor of line pressure PL against pressure Ps is sufficiently secured by virtue of the differential pressure (Pp−Ps), as long as line pressure PL is set at a value higher than or equal to primary pressure Pp. Therefore, line pressure PL can be decreased up to the level of primary pressure Pp in the overdrive side.

In the line pressure control apparatuses disclosed in the above two related-art documents, line pressure PL is maintained high irrespective of whether transmission ratio Ip is in the Low side or in the overdrive side. In the case where line pressure PL is maintained high by activating an oil pump during the overdrive even through the above-mentioned safety factor is ensured, an energy of engine goes to waste by an unneeded mount of line pressure PL. Accordingly, a fuel economy worsens.

It is therefore an object of the present invention to provide hydraulic control apparatus and method for a belt-type continuously-variable transmission, devised to improve the fuel economy by reducing a pumping loss during the overdrive running which normally occurs frequently.

According to one aspect of the present invention, there is provided a hydraulic control apparatus comprising: a continuously-variable transmission including a pair of drive pulleys including a first movable pulley and a first fixed pulley, a pair of driven pulleys including a second movable pulley and a second fixed pulley, and a belt wound between the pair of drive pulleys and the pair of driven pulleys, the continuously-variable transmission being adapted to be continuously shifted by moving at least one of the first movable pulley and the second movable pulley by means of hydraulic pressure and thereby varying at least one of a groove width between the pair of drive pulleys and a groove width between the pair of driven pulleys to vary a winding radius of the belt; a line-pressure control section configured to produce a line pressure by adjusting a discharge pressure of an oil pump; a first hydraulic-pressure control section configured to adjust a first hydraulic pressure based on the line pressure, the first hydraulic pressure being supplied to the drive pulleys; and a second hydraulic-pressure control section configured to adjust a second hydraulic pressure based on the line pressure, the second hydraulic pressure being supplied to the driven pulleys, the line-pressure control section being configured to adjust the line pressure to a value set by adding a margin pressure to higher one of the first hydraulic pressure and the second hydraulic pressure, and to reduce the margin pressure when the first hydraulic pressure is higher than the second hydraulic pressure.

According to another aspect of the present invention, there is provided a hydraulic control apparatus comprising: a continuously-variable transmission including a pair of drive pulleys including a first movable pulley and a first fixed pulley, a pair of driven pulleys including a second movable pulley and a second fixed pulley, and a belt wound between the pair of drive pulleys and the pair of driven pulleys, the continuously-variable transmission being adapted to be continuously shifted by moving at least one of the first movable pulley and the second movable pulley by means of hydraulic pressure and thereby varying at least one of a groove width between the pair of drive pulleys and a groove width between the pair of driven pulleys; first means for producing a line pressure by adjusting a discharge pressure of an oil pump; second means for adjusting a first hydraulic pressure based on the line pressure, the first hydraulic pressure being supplied to the drive pulleys; and third means for adjusting a second hydraulic pressure based on the line pressure, the second hydraulic pressure being supplied to the driven pulleys, the first means including means for adjusting the line pressure to a value set by adding a margin pressure to higher one of the first hydraulic pressure and the second hydraulic-pressure, and means for reducing the margin pressure when the first hydraulic pressure is higher than the second hydraulic pressure.

According to still another aspect of the present invention, there is provided a hydraulic control method for a continuously-variable transmission including a pair of drive pulleys including a first movable pulley and a first fixed pulley, a pair of driven pulleys including a second movable pulley and a second fixed pulley, and a belt wound between the pair of drive pulleys and the pair of driven pulleys, the continuously-variable transmission being adapted to be continuously shifted by moving at least one of the first movable pulley and the second movable pulley by means of hydraulic pressure and thereby varying at least one of a groove width between the pair of drive pulleys and a groove width between the pair of driven pulleys, the hydraulic control method comprising: producing a line pressure by adjusting a discharge pressure of an oil pump so as to bring the line pressure to a value set by adding a margin pressure to higher one of a target first hydraulic pressure and a target second hydraulic pressure; adjusting a first hydraulic pressure to the target first hydraulic pressure on the basis of the line pressure, the first hydraulic pressure being supplied to the drive pulleys; adjusting a second hydraulic pressure to the target second hydraulic pressure on the basis of the line pressure, the second hydraulic pressure being supplied to the driven pulleys; and reducing the margin pressure when the first hydraulic pressure is higher than the second hydraulic pressure.

The other objects and features of this invention will become understood from the following description with reference to the accompanying drawings.

DETAILED DESCRIPTION OF THE INVENTION

Hereinafter, embodiments according to the present invention will be explained. Reference will be made to the drawings in order to facilitate a better understanding of the present invention.

First Embodiment

Schematic Configuration of Automatic Transmission

Figure 1:
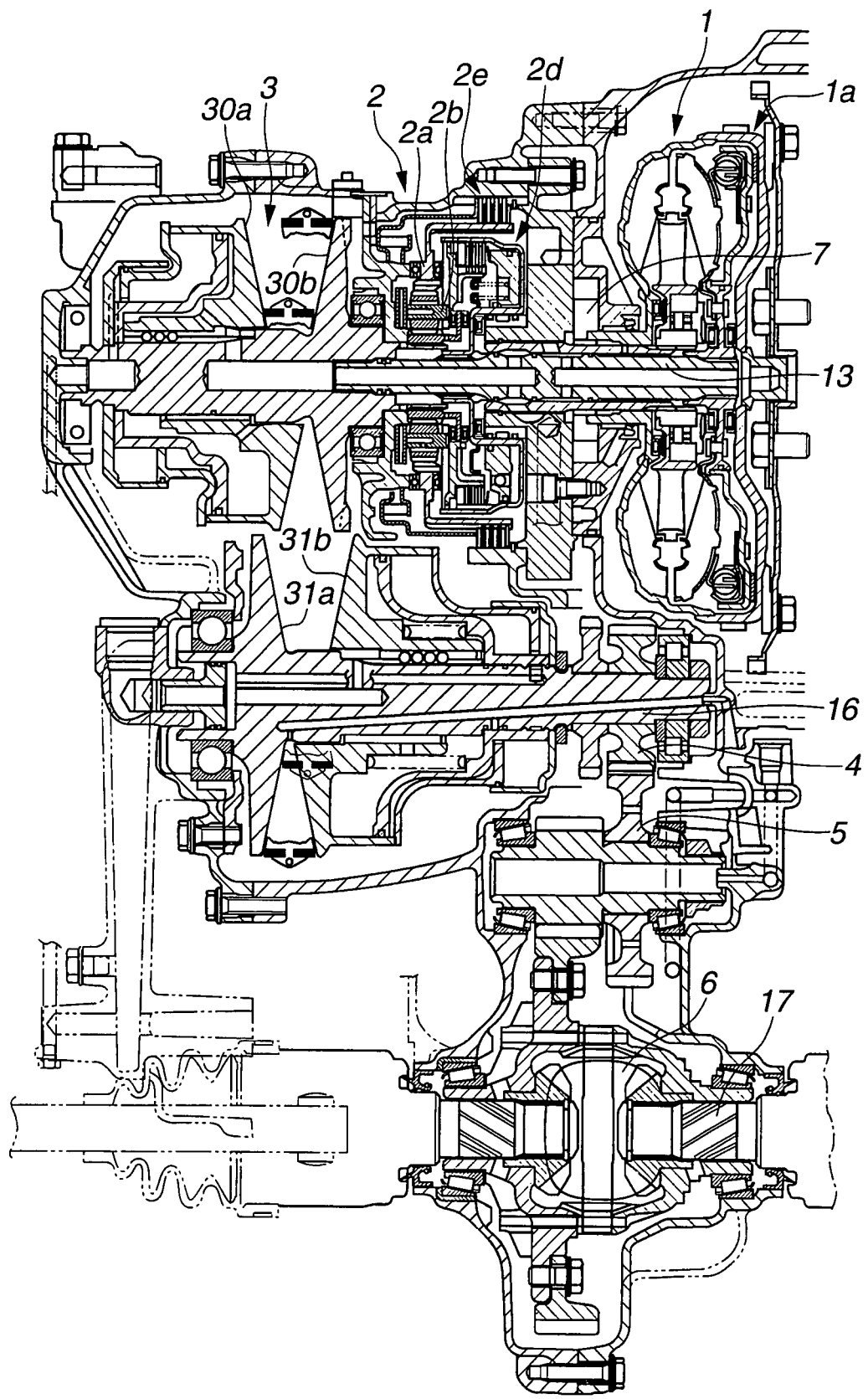
FIG. 1 is a schematic sectional view of an automatic transmission to which a hydraulic control apparatus according to the present invention is applied.
Figure 2:
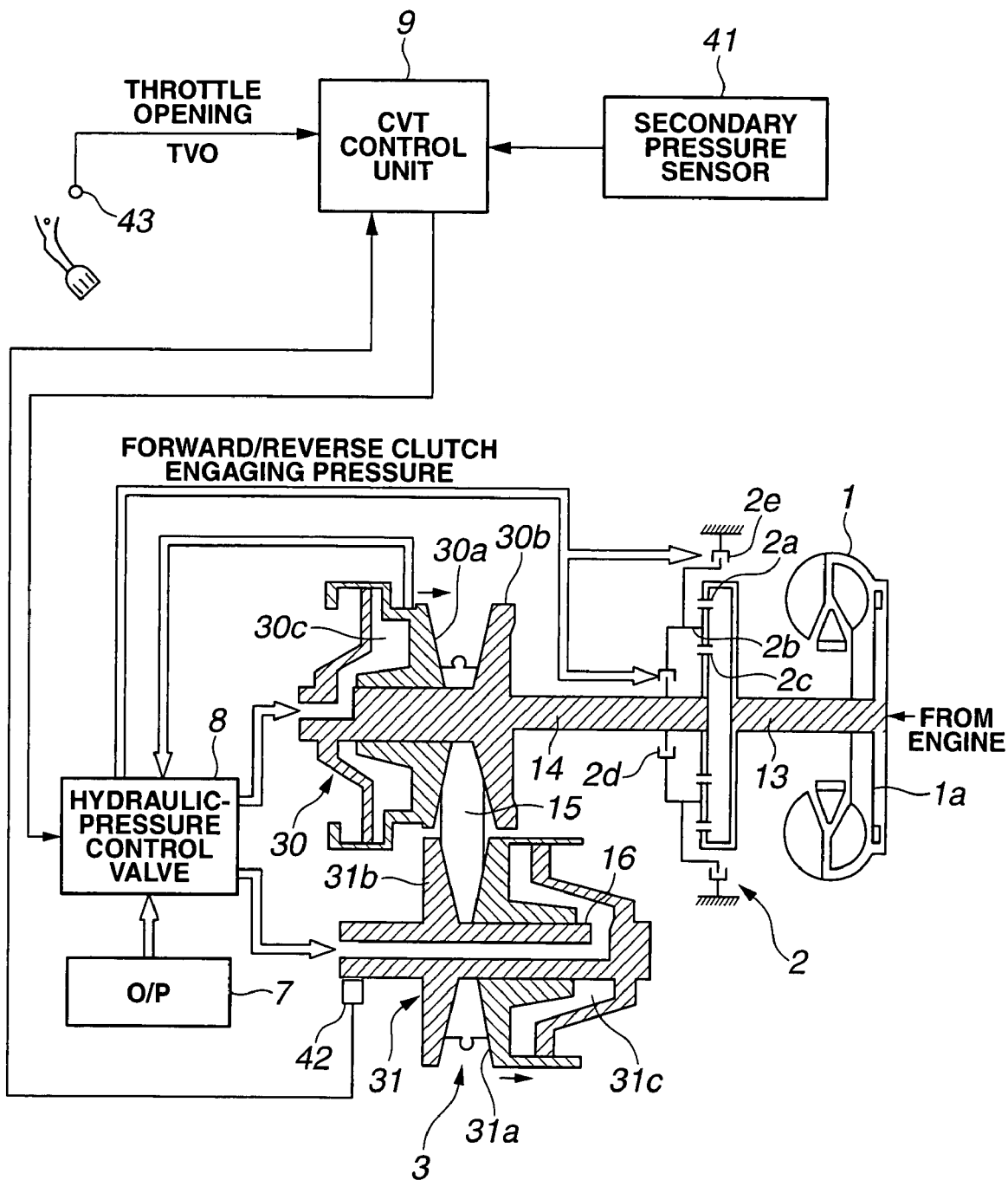
FIG. 2 is a schematic view of a control system of the automatic transmission to which the hydraulic control apparatus according to the present invention is applied.

FIG. 1 is a schematic sectional view of an automatic transmission for FF vehicle (front-engine front-drive vehicle) to which a hydraulic control apparatus according to the present invention is applied. FIG. 2 shows a schematic control system of the automatic transmission. The automatic transmission includes a torque converter 1 adapted to increase a torque derived from an engine, a forward/reverse switching mechanism 2 having a starting clutch, a CVT (continuously-variable transmission) 3 adapted to continuously vary a transmission ratio between input and output of the CVT (i.e., adapted to change a transmission ratio in stepless), an idler gear 5 adapted to conduct a speed reduction, and a differential (gear) 6. The automatic transmission further includes an oil pump 7 and a hydraulic control valve unit 8, as a mechanism for supplying hydraulic pressure or lubricating oil to respective units.

Forward/reverse switching mechanism 2 is constructed by a planetary gear mechanism including a ring gear 2a, a pinion carrier 2b, and a sun gear 2c. Ring gear 2a is connected with an output shaft 13 of torque converter 1, and sun gear 2c is connected with an input shaft 14 of CVT 3. Pinion carrier 2b is equipped with a reverse brake 2e for fixing pinion carrier 2b to a transmission case, and a forward clutch 2d for connecting pinion carrier 2b integrally with input shaft 14 of CVT 3.

CVT 3 includes a primary pulley 30 (i.e., a pair of drive pulleys having a primary movable pulley 30a and a primary fixed pulley 30b), a secondary pulley 31 (i.e., a pair of driven pulleys having a secondary movable pulley 31a and a secondary fixed pulley 31b), and a belt 15. Primary pulley 30 is provided at an end portion of CVT input shaft 14, and secondary pulley 31 is provided on a driven shaft 16. Belt 15 is wound between grooves of respective pulleys 30 and 31 (i.e., primary pulley 30 and secondary pulley 31 are connected by belt 15 running therebetween), and serves to transmit a rotational force of primary pulley 30 to secondary pulley 31. An output gear 4 is provided at an end portion of driven shaft 16, and engages with idler gear 5.

The rotational force inputted from the engine (not shown) to the automatic transmission is transmitted through torque converter 1 and forward/reverse switching mechanism 2 to CVT input shaft 14. The rotational force of CVT input shaft 14 is transmitted through primary pulley 30, belt 15, secondary pulley 31, and driven shaft 16 to idler gear 5. The rotation of idler gear 5 is transmitted through differential gear 6 to a drive shaft 17, and thereby drive wheels are driven.

(Configuration of Hydraulic Circuit)

Figure 3:
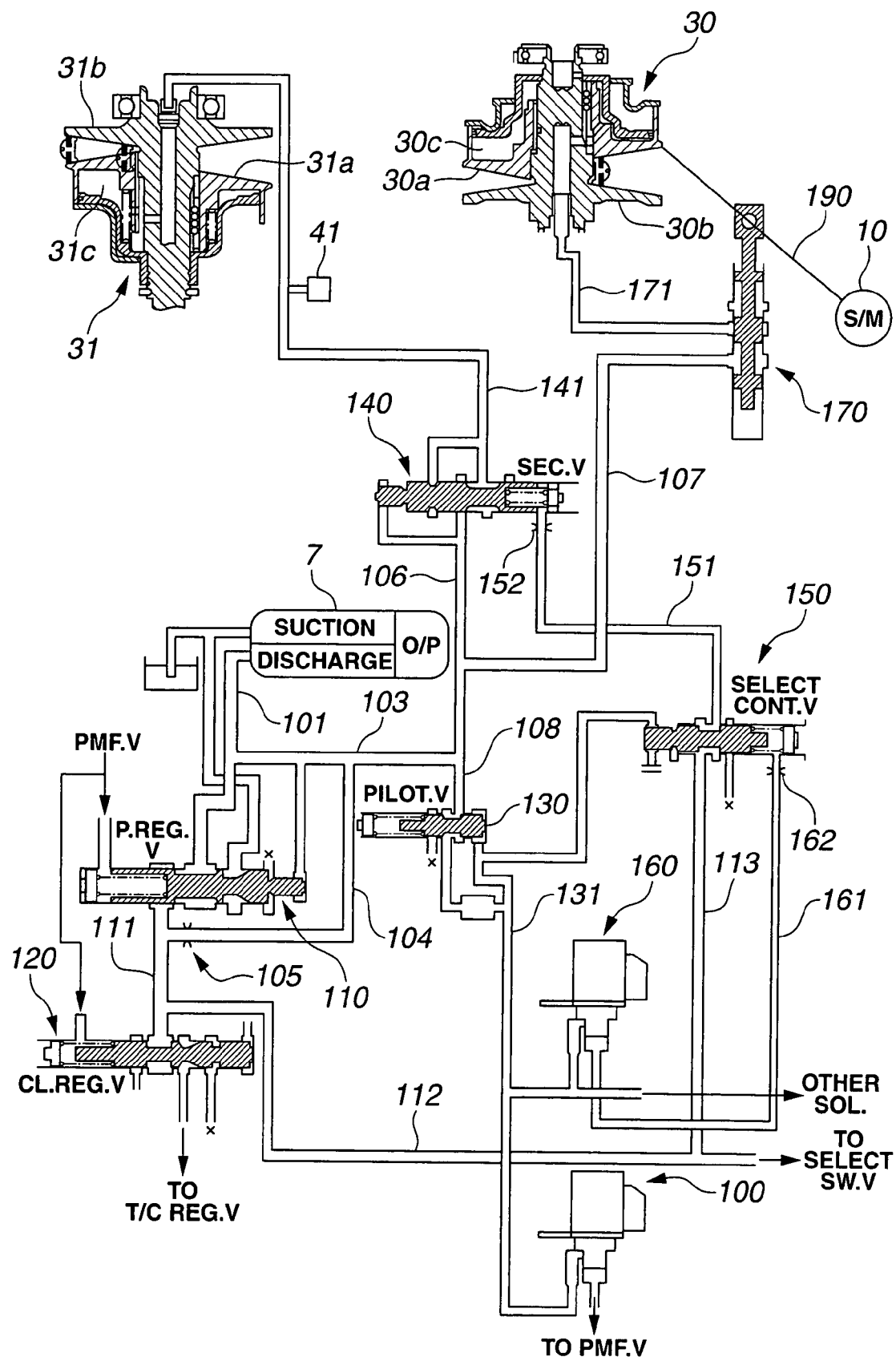
FIG. 3 is a hydraulic circuit diagram of a step-motor type system.

FIG. 3 shows a part of hydraulic circuit in hydraulic control valve unit 8. A delivery (discharge) port of oil pump 7 is connected through an oil passage 101 with a pressure regulator valve (P.REG.V) 110 for adjusting or regulating a line pressure (hereinafter, PL). Line pressure PL adjusted between oil pump 7 and P.REG.V 110 is supplied (applied) to an oil passage 103 connected with oil passage 101.

Oil passage 103 is connected with an oil passage 104, an oil passage 106, and an oil passage 108. Oil passage 104 is connected through an orifice 105 with an after-mentioned oil passage 111. Oil passage 106 is connected with a secondary valve (SEC.V) 140 for supplying a hydraulic pressure of a cylinder chamber 31c of secondary pulley 31. An oil passage 107 is connected with a shift control valve 170 for supplying a hydraulic pressure of a cylinder chamber 30c of primary pulley 30. An oil passage 108 is connected with a pilot valve (PILOT.V) 130.

PILOT.V 130 serves to supply a pilot pressure which is a base pressure for signal pressures. The pilot pressure is supplied through an oil passage 131 to a line-pressure solenoid 100. A signal pressure derived from line-pressure solenoid 100 is supplied to a pressure modifier valve (not shown). A supplying hydraulic-pressure of the pressure modifier valve which is adjusted by the signal pressure derived from line-pressure solenoid 100 operates as a back pressure of P.REG.V 110, and thereby adjusts the line pressure PL.

In a downstream side of P.REG.V 110, P.REG.V 110 is connected through oil passage 111 with a clutch regulator valve (CL.REG.V) 120. CL.REG.V 120 serves to adjust or regulate a third hydraulic-pressure lower than line pressure PL (e.g., an engaging pressure for forward clutch 2d). Oil passage 111 is connected through orifice 105 with oil passage 104. The third hydraulic-pressure adjusted between P.REG.V 110 and oil passage 111 is supplied to a select switching valve (not shown), and also supplied through an oil passage 113 to a secondary control valve (SEC.CONT.V) 150 serving as a proportional control valve.

The pilot pressure adjusted by PILOT.V 130 is supplied (applied) through oil passage 131 to a secondary-pressure solenoid 160. A signal pressure adjusted by secondary-pressure solenoid 160 is supplied through an oil passage 161 to SEC.CONT.V 150 as a back pressure of SEC.CONT.V 150. A fourth hydraulic-pressure (a hydraulic pressure adjusted from the third hydraulic-pressure) adjusted by SEC.CONT.V 150 is supplied as a back pressure of SEC.V 140. A pressure Ps adjusted by SEC.V 140 by using line pressure PL as a base pressure is supplied to secondary-pulley cylinder chamber 31c.

Shift control valve 170 is connected with an oil passage 171 for supplying a pressure Pp to primary-pulley cylinder chamber 30c. Moreover, shift control valve 170 is connected through a link 190 with a step motor 10 and a mechanism for sensing a groove width of primary pulley 30 (an after-mentioned transmission ratio sensor 30d). This structure forms a mechanical feedback mechanism for controlling the transmission ratio (pulley ratio, or speed ratio of transmission) Ip by way of feedback control, on the basis of a driving amount of step motor 10 namely a rotational step number.

(Configuration of Shift Control Valve)

Figure 4:
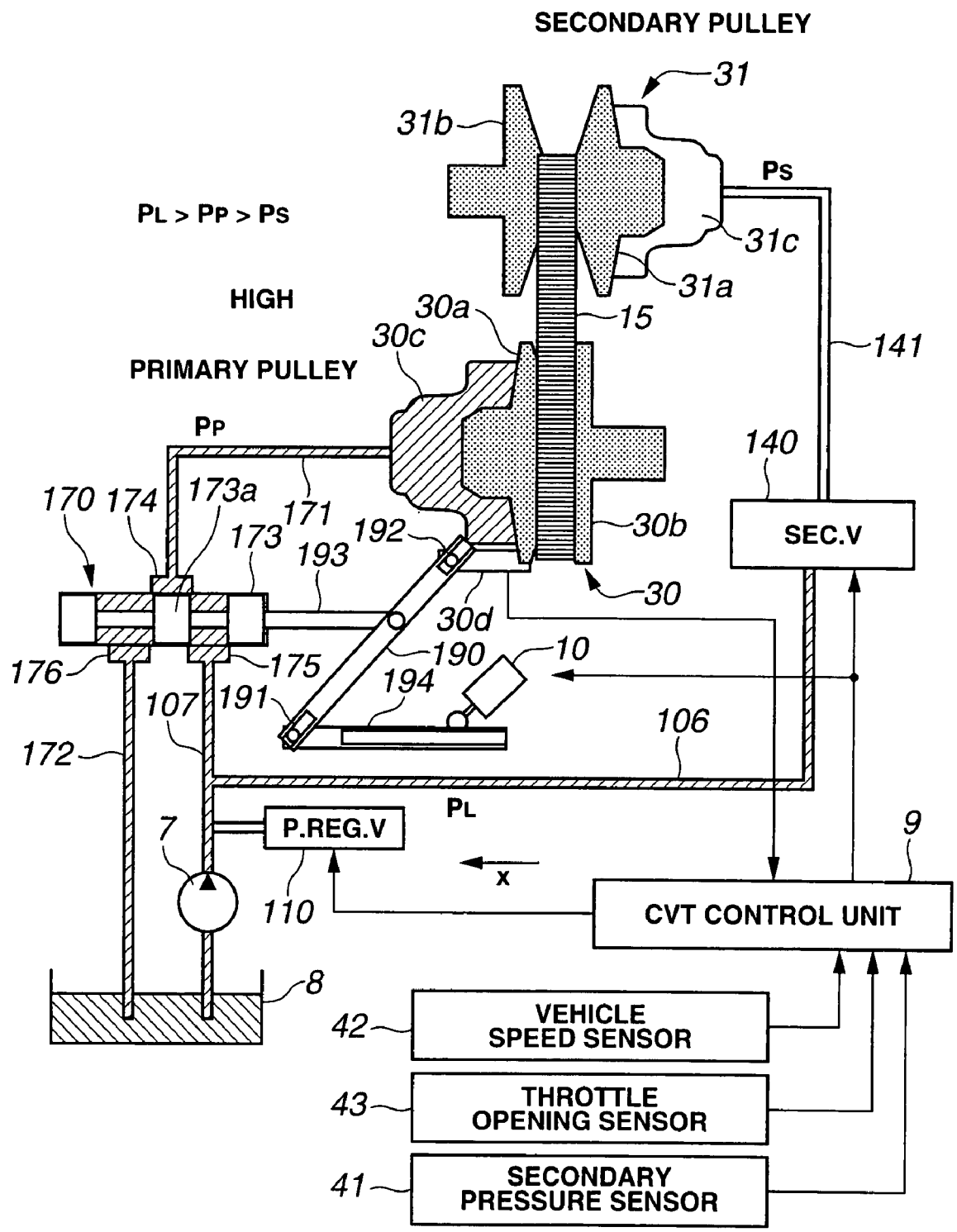
FIG. 4 is a schematic view of a mechanical feedback mechanism.

FIG. 4 shows a schematic configuration of the mechanical feedback mechanism of shift control valve 170. For illustrative purposes; X-axis is provided in an axial direction of primary pulley 30, and a primary movable pulley 30a's side relative to primary fixed pulley 30b's position is defined as a positive direction of the X-axis.

The mechanical feedback mechanism includes a first rod 194 capable of moving in the X-axis direction by just a displacement (amount) corresponding to the rotational step number of step motor 10. An X-axis-positive-direction end of first rod 194 is connected with one end 191 of link 190 so as to be rotatably movable. Another end 192 of link 190 is rotatably connected with transmission ratio sensor 30d provided at an outer-diameter end portion (an outer peripheral portion) of primary movable pulley 30a. Namely, the both ends of link 190 are respectively joined with first rod 194 and primary movable pulley 30a to allow first rod 194 and primary movable pulley 30a to move in the X-axis direction.

An X-axis-negative-direction end of a second rod 193 is rotatably connected with a middle portion of link 190. Second rod 193 is provided integrally with a spool 173 of shift control valve 170, and another end (an X-axis-positive-direction end) of second rod 193 is fixed to an X-axis-negative-direction end of spool 173.

Shift control valve 170 includes a PL supplying port 175, a Pp supplying port 174, and a drain port 176. PL supplying port 175 is open to oil passage 107, and is communicated with oil pump 7. Pp supplying port 174 is open to oil passage 171, and is communicated with primary-pulley cylinder chamber 30c. Drain port 176 is open to a drain oil passage 172, and is communicated with an oil pan 8.

A land portion 173a of spool 173 in shift control valve 170 is adapted to switch between the following two states in accordance with a position of spool 173. In one state, pressure Pp is decreased by draining working fluid of primary-pulley cylinder chamber 30c. In another state, pressure Pp is increased by supplying working fluid to primary-pulley cylinder chamber 30c.

Namely, in a neutral position of spool 173; land portion 173a causes oil passage 171 and oil passage 107 to be not communicated with each other and also causes oil passage 171 and drain oil passage 172 to be not communicated with each other, by shutting off or closing Pp supplying port 174. When spool 173 is moved from the neutral position in the X-axis positive direction; Pp supplying port 174 shut off by land portion 173a is made to be communicated with oil passage 107 but is kept not communicated with drain oil passage 172. Moreover when spool 173 is moved from the neutral position in the X-axis negative direction; Pp supplying port 174 shut off by land portion 173a is made to be communicated with drain oil passage 172 but is kept not communicated with oil passage 107.

(Mechanical Feedback Mechanism)

Now, the shift control using the before-mentioned mechanical feedback mechanism will be explained. Step motor 10 is driven, and thereby shift control valve 170 is shifted from the shutoff position through link 190. Then, the hydraulic pressure of primary-pulley cylinder chamber 30c is varied, and thereby the shift is carried out. Because of this shift, the groove width of primary pulley 30 is varied. In response to this variation of groove width; a feedback information is transmitted through link 190 to shift control valve 170. Then, shift control valve 170 is returned to the shutoff position. Namely, the shift control using the mechanical feedback mechanism is configured to control the transmission ratio Ip by way of feedback control on the basis of the driving amount (rotational step number corresponding to an after-mentioned step-motor command value Ip0step) for step motor 10.

(Low)

Figure 5:
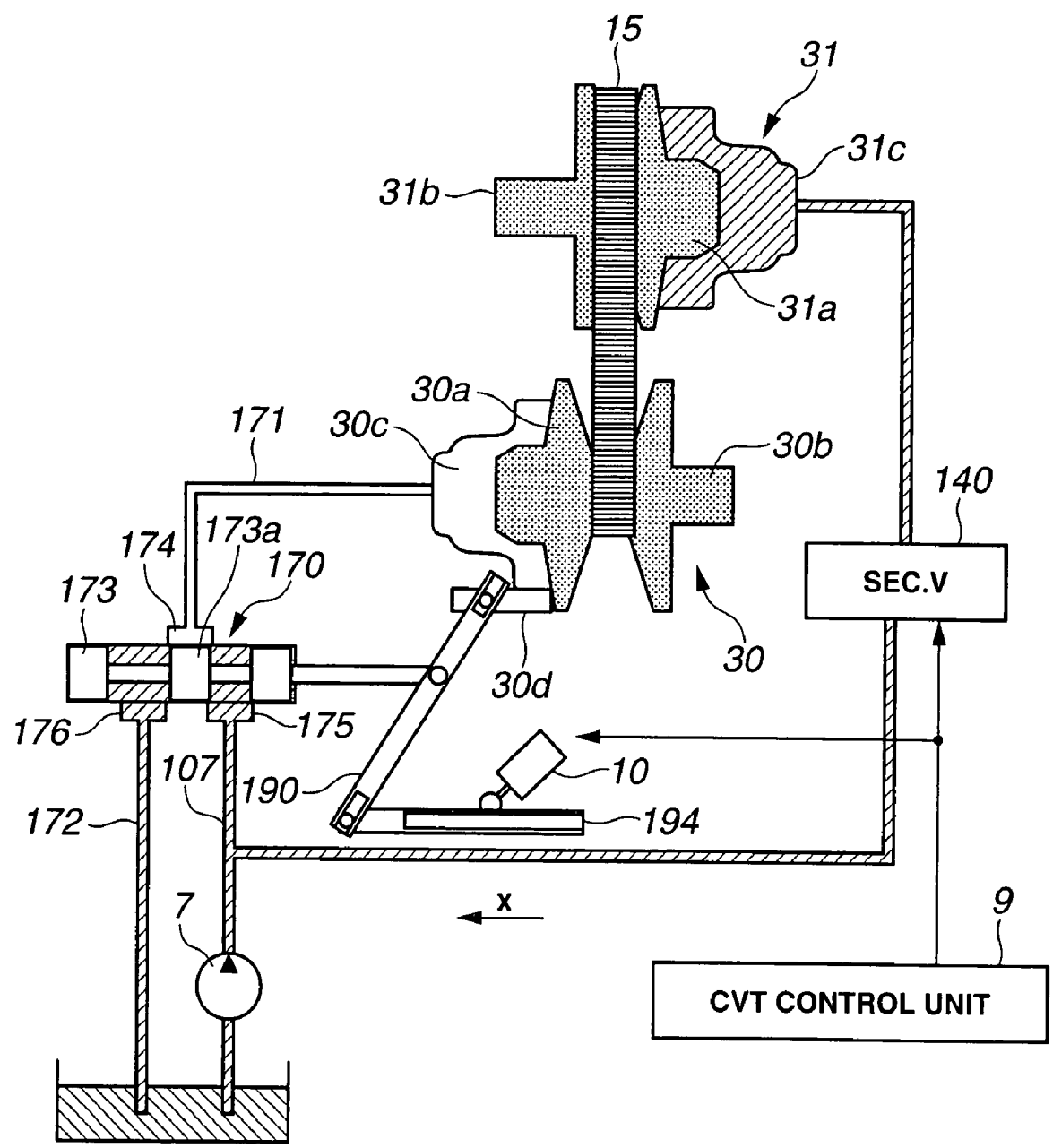
FIG. 5 is a schematic view of the mechanical feedback mechanism (in Low side).

FIG. 5 shows a hydraulic circuit for CVT 3 in the state where transmission ratio Ip is in the Low side. The groove width of primary pulley 30 is wide, and the winding radius of belt 15 wound around primary pulley 30 is small. On the other hand, the groove width of secondary pulley 31 is narrow, and the winding radius of belt 15 wound around secondary pulley 31 is large. Moreover, Pp supplying port 174 is shut off by land portion 173a of spool 173 of shift control valve 170. Primary-pulley cylinder chamber 30c is not in communication with oil passage 107 and drain oil passage 172. Hence, transmission ratio Ip is maintained at a target transmission ratio Ip0.

(Upshift)

Figure 6:
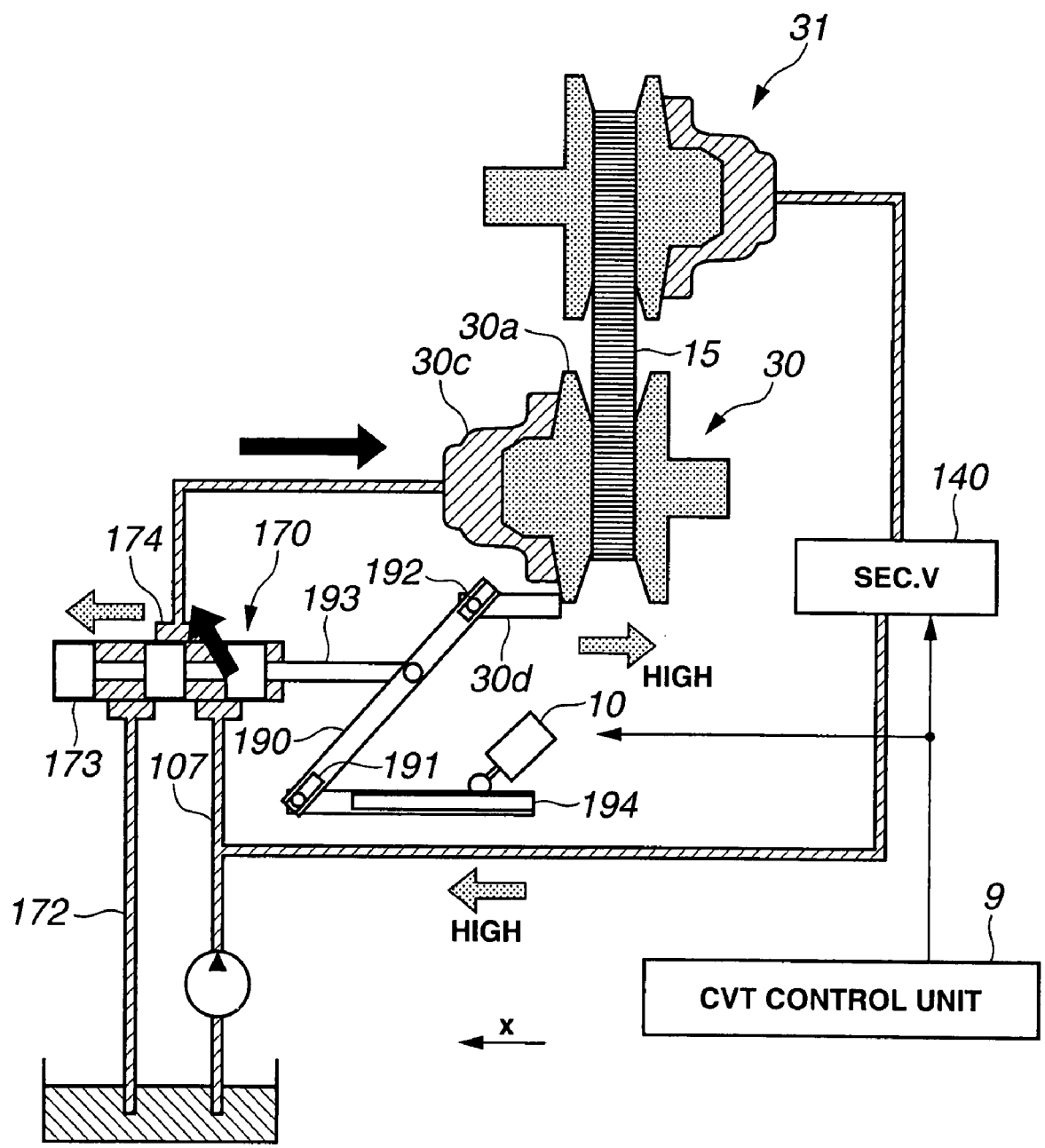
FIG. 6 is a schematic view of the mechanical feedback mechanism (upshift).

FIG. 6 shows a flow of working fluid in the hydraulic circuit for CVT 3, in the case where an upshift is carried out from the state where transmission ratio Ip is in the Low side. When the rotational step number of step motor 10 is increased by an amount corresponding to target transmission ratio Ip0 desirable after the upshift, first rod 194 moves in the positive direction of X-axis by a prescribed amount (degree). Accordingly, link 190 connected with first rod 194 is moved or rotated around its end 192 (above-mentioned another end 192) in a clockwise direction of FIG. 6. Hence, second rod 193 connected with the middle portion of link 190 is moved in the positive direction of X-axis. Therefore through link 190, spool 173 of shift control valve 170 is also moved in the positive direction of X-axis. Thereby, Pp supplying port 174 is communicated with oil passage 107, and working fluid is supplied from highly-pressurized line pressure PL side to primary-pulley cylinder chamber 30c.

Moreover, when primary movable pulley 30a moves in the negative direction of X-axis, link 190 connected with transmission ratio sensor 30d attached at the end of primary movable pulley 30a is rotatably moved in the clockwise direction of FIG. 6 around connecting portion 191 (above-mentioned one end 191) for connecting with first rod 194. Accordingly, second rod 193 connected with the middle portion of link 190 moves in the negative direction of X-axis. Thereby, spool 173 of shift control valve 170 also moves in the negative direction of X-axis, and land portion 173a of spool 173 reduces an opening degree of communication between Pp supplying port 174 and oil passage 107. Thereby, the quantity of working fluid for being supplied to primary-pulley cylinder chamber 30c is reduced.

Furthermore, when primary movable pulley 30a moves excessively in the negative direction of X-axis, spool 173 of shift control valve 170 further moves in the negative direction of X-axis. Accordingly, land portion 173a causes primary-pulley cylinder chamber 30c to communicate with drain oil passage 172, and thereby drains working fluid from primary-pulley cylinder chamber 30c.

Thus by means of the mechanically-constructed feedback mechanism, only the quantity of working fluid corresponding to the driving amount (manipulated variable) for step motor 10 is supplied to primary-pulley cylinder chamber 30c. Hence, pressure Pp becomes higher, primary movable pulley 30a is pressed and moves in the negative direction of X-axis, and the groove width of primary pulley 30 is narrowed. Accordingly, the winding radius Rp of belt 15 wound on primary pulley 30 becomes larger. On the other hand, pressure Ps is decreased up to a value for achieving target transmission ratio Ip0, by means of the control conducted by SEC.V 140. The groove width of secondary pulley 31 is widened, and the winding radius Rs of belt 15 wound on secondary pulley 31 becomes smaller. Therefore, the upshift is performed so as to cause transmission ratio Ip to accord with target transmission ratio Ip0.

(High)

Figure 7:
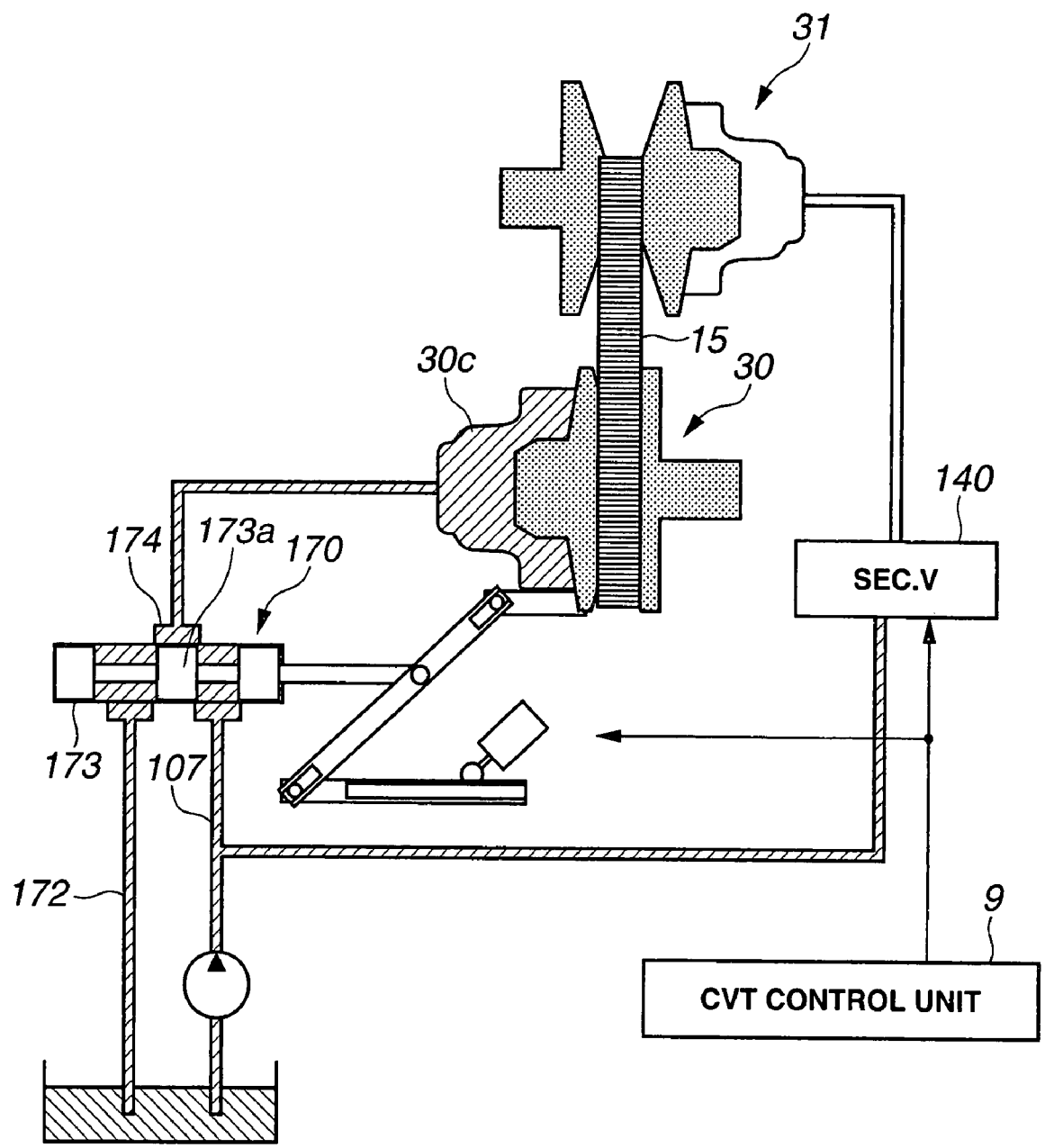
FIG. 7 is a schematic view of the mechanical feedback mechanism (in High side).

FIG. 7 shows a state of the hydraulic circuit for CVT 3 in the state where transmission ratio Ip is in the High (Ip takes a smallest value in the overdrive side). The groove width of primary pulley 30 is narrow, and the belt winding radius Rp is large. On the other hand, the groove width of secondary pulley 31 is wide, and belt winding radius Rs is small. Moreover, land portion 173a of spool 173 of shift control valve 170 is shutting off (closing) Pp supplying port 174, and primary-pulley cylinder chamber 30c is not in communication with oil passage 107 and drain oil passage 172. Hence, transmission ratio Ip is maintained at target transmission ratio Ip0.

In addition, working fluid consistently leaks out from primary-pulley cylinder chamber 30c and secondary-pulley cylinder chamber 31c. With regard to primary pulley 30; the leaked working fluid is automatically resupplied by means of the above-mentioned mechanical feedback mechanism. With regard to secondary pulley 31; pressure Ps is adjusted by secondary valve SEC.V 140, and the leaked working fluid is resupplied. Therefore, transmission ratio Ip is maintained at target transmission ratio Ip0 even when the shift is not being carried out.

(Downshift)

Figure 8:
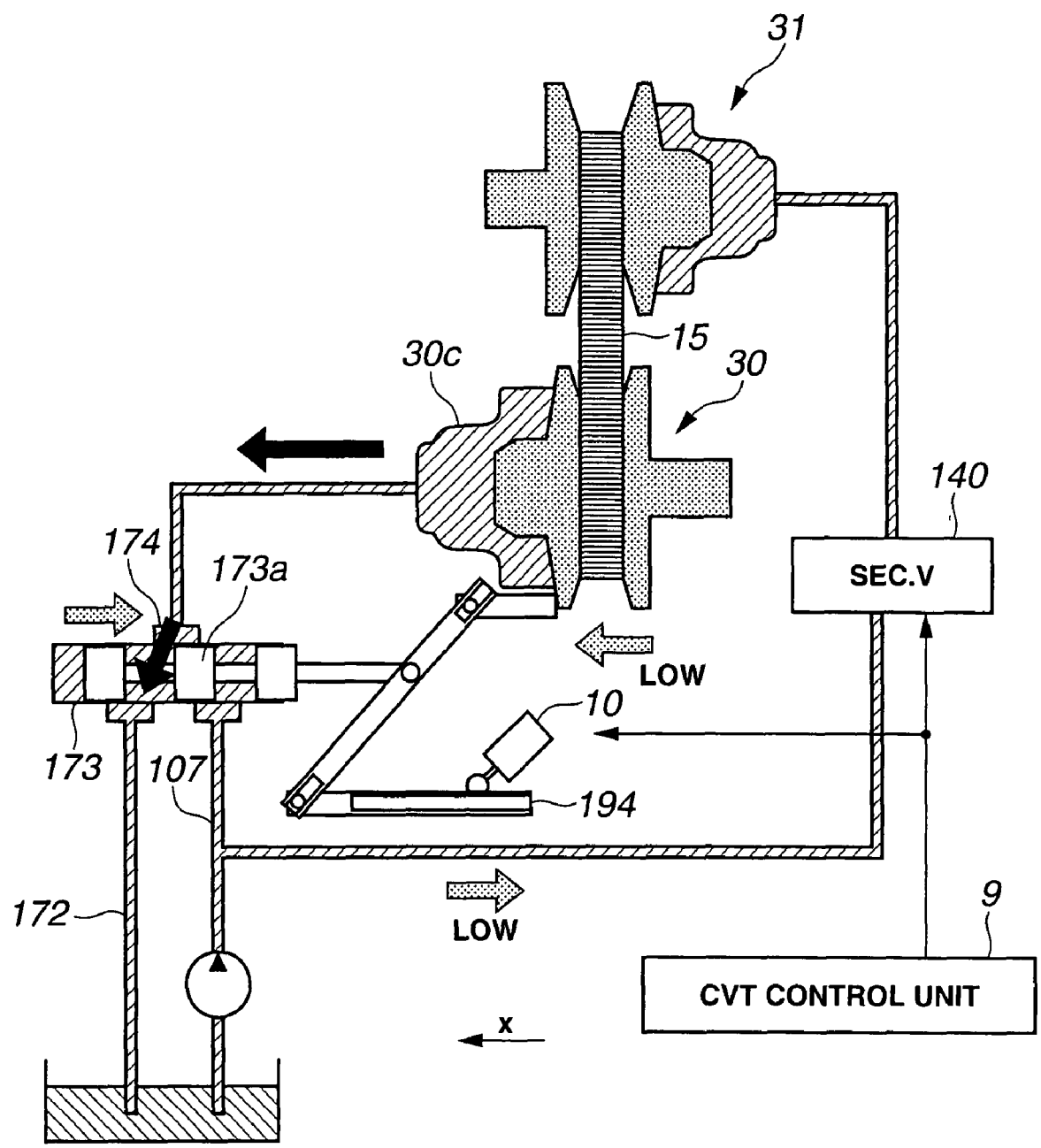
FIG. 8 is a schematic view of the mechanical feedback mechanism (downshift).

FIG. 8 shows a flow of working fluid in the hydraulic circuit for CVT 3, in the case where a downshift is carried out from the state where transmission ratio Ip is in the High. When a down shift command occurs, first rod 194 is made to move in the negative direction of X-axis by reducing the rotational step number of step motor 10. Accordingly, spool 173 of shift control valve 170 moves in the negative direction of X-axis, and primary-pulley cylinder chamber 30c is communicated with drain oil passage 172. Thus, transmission ratio Ip varies to the downshift side when pressure Pp is reduced. When transmission ratio Ip becomes close to target transmission ratio Ip0; land portion 173a of spool 173 is controlled by mechanical feedback, so as to cause primary-pulley cylinder chamber 30c not to communicate with oil passage 107 and also not to communicate with drain oil passage 172. Hence, target transmission ratio Ip0 is maintained.

As described above, shift control valve 170 is controlled by the mechanical feedback mechanism using link 190, and thereby pressure Pp is adjusted based on (by reducing) line pressure PL. At the same time, SEC.V 140 is controlled in conformity with this adjustment for pressure Pp, and thereby pressure Ps is adjusted based on (by reducing.) line pressure PL. Namely, a predetermined transmission ratio Ip is achieved by varying the balance between pressures Pp and Ps (so-called, both-pressure regulating method in which both of Pp and Ps are adjusted).

(Configuration of Electronic Control System)

Figure 9:
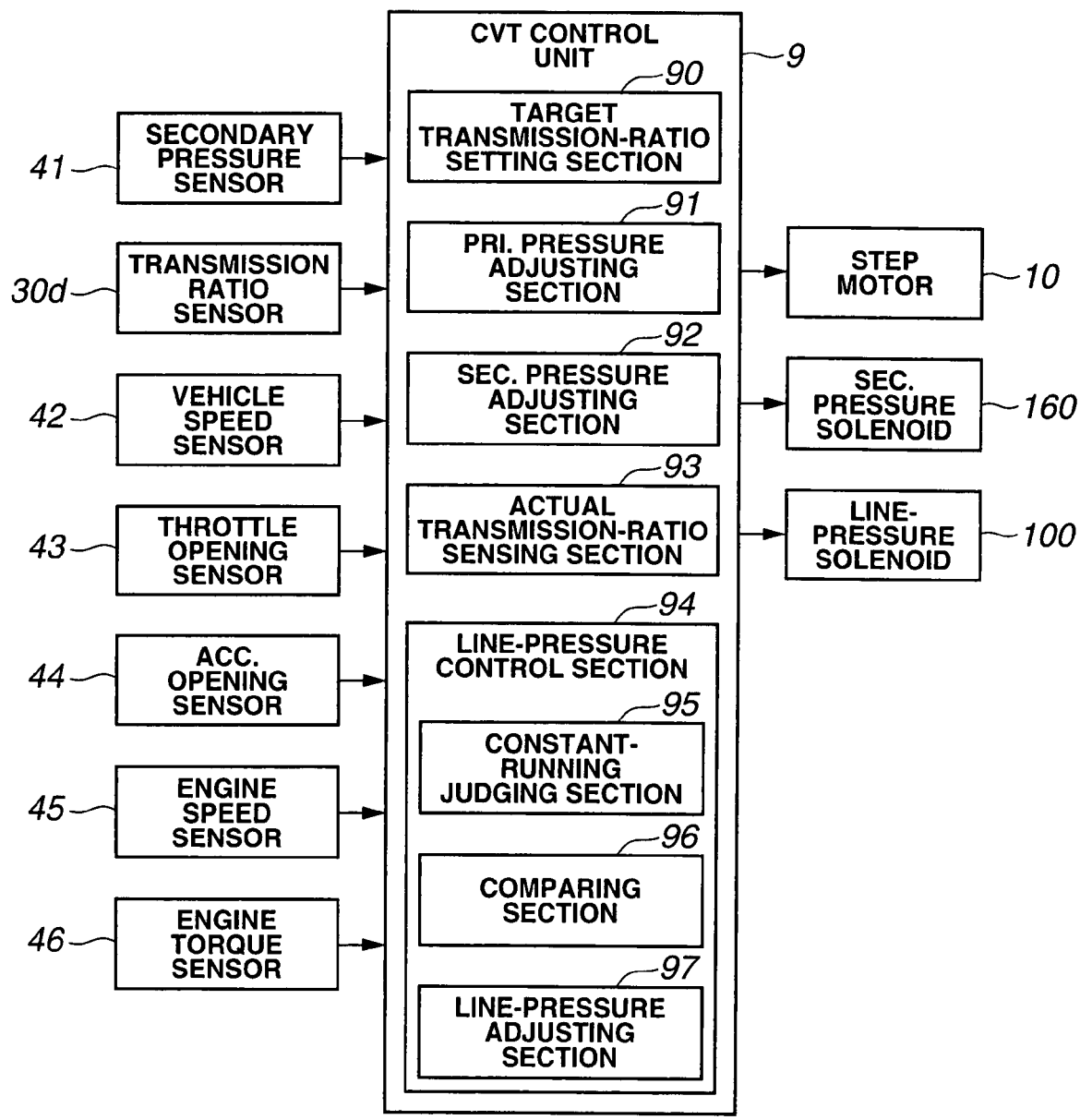
FIG. 9 is a block diagram of an electronic control system in first to fourth embodiments.

FIG. 9 is a block diagram of an electronic control system for CVT 3. The electronic control system includes various sensors, a CVT control unit 9, and various actuators. The various sensors include a secondary pressure sensor 41, transmission ratio sensor (position sensor) 30d, a vehicle speed sensor 42, a throttle opening (degree) sensor 43, an accelerator opening sensor 44, an engine rotational speed sensor 45, and an engine torque sensor 46.

CVT control unit 9 includes a target transmission-ratio setting section (or means) 90, a primary-pressure adjusting section (or means) 91, a secondary-pressure adjusting section (or means) 92, an actual transmission-ratio sensing section (or means) 93, and a line-pressure control section (or means) 94. Line-pressure control section 94 includes a constant-running judging section (or means) 95, a comparing section (or means) 96, and a line-pressure adjusting section (or means) 97. Various actuators include step motor 10, secondary-pressure solenoid 160, and line-pressure solenoid 100.

CVT control unit 9 calculates on the basis of input signals derived from the above-mentioned various sensors, and outputs drive signals based on the calculated results to the above-mentioned various actuators. Target transmission-ratio setting section 90 sets target transmission ratio Ip0 by using a predetermined shift map, on the basis of the sensing signals derived from vehicle speed sensor 42, accelerator opening sensor 44, and engine rotational speed sensor 45. Primary-pressure adjusting section 91 outputs command current Ip0step according to target transmission ratio Ip0 (i.e., step-motor command value Ip0step for achieving target transmission ratio Ip0) to step motor 10. Secondary-pressure adjusting section 92 sets a target secondary pressure Ps0, and outputs a command current according to target secondary pressure Ps0 to secondary-pressure solenoid 160. Actual transmission-ratio sensing section 93 senses an actual transmission ratio Ip on the basis of a signal derived from transmission ratio sensor 30d. The actual transmission ratio, i.e., the rotational-speed ratio can be calculated based on detection values derived from a primary rotational-speed sensor and a secondary rotational-speed sensor, as discussed in the third embodiment.

Constant-running judging section 95 of line-pressure control section 94 judges whether or not the vehicle is under a running state where a vehicle speed and a throttle (valve) opening are constant, on the basis of signals from vehicle speed sensor 42 and throttle opening sensor 43. Comparing section 96 compares target transmission ratio Ip0 with actual transmission ratio Ip. Line-pressure adjusting section 97 calculates a target line pressure PL0, and sets a command pressure PL* according to this PL0. Then, line-pressure adjusting section 97 converts command pressure PL* into a command current, and outputs this command current to line-pressure solenoid 100.

(Setting of Primary Pressure and Secondary Pressure)

Figure 10:
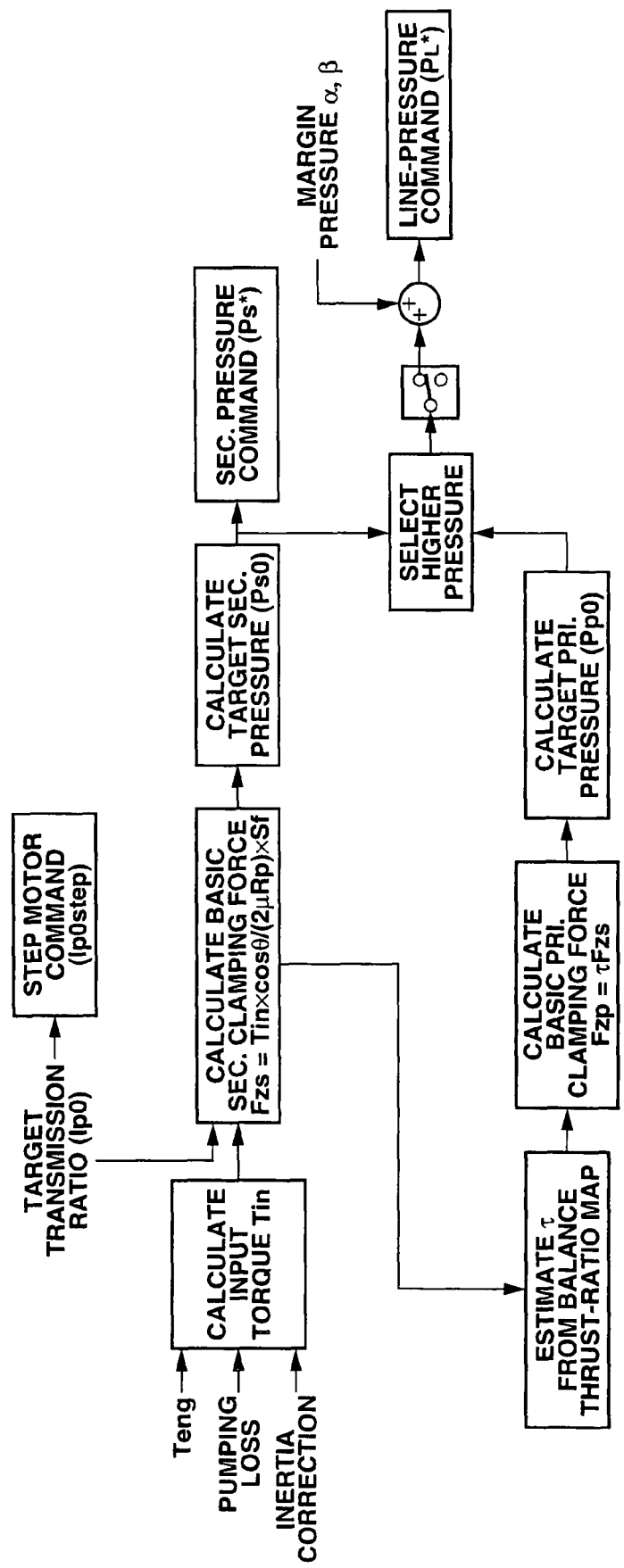
FIG. 10 is a block diagram showing a process of setting a primary pressure and a line pressure.

FIG. 10 is a block diagram showing a setting process for a target primary pressure Pp0, target secondary pressure Ps0, and target line pressure PL0. As shown in FIG. 10, at first, an input torque Tin for CVT 3 is calculated on the basis of an engine torque Teng, an energy loss necessary to drive oil pump 7, and an inertia compensation amount necessary for a rotational-speed increase of output shaft 13 of torque converter and the like.

Next, a target value of a pressing force (a secondary-pulley thrust) Fzs by which secondary movable pulley 31a presses or clamps belt 15 is calculated. Namely, a basic secondary-pulley thrust Fzs which is capable of transmitting the torque without causing the belt slip in secondary pulley 31 is calculated by using the following formula: $Fzs=Tin \times \cos \theta /(2 \mu Rp) \times Sf$. Where, $\mu$ denotes a friction coefficient between the pulley and the (belt) element, Rp denotes the belt winding radius on the primary side, Sf denotes a predetermined safety factor (safety margin) against the belt slip, and $\theta$ denotes a pulley half vertex angle (sheave angle). These can be calculated based on target transmission ratio Ip0 and the like. Then, target secondary pressure Ps0 is calculated based on the basic secondary-pulley thrust Fzs, and a command pressure Ps* according to this Ps0 is set. Thus-set Ps* is converted into the command current, and is outputted to secondary-pressure solenoid 160. Thereby, secondary pressure Ps is adjusted to target secondary pressure Ps0.

On the other hand, a balance thrust ratio $\tau$ (Fzp/Fzs) corresponding to target transmission ratio Ip0 is estimated with reference to a map of FIG. 11 as mentioned below. Then, a target value of a pressing force (a primary-pulley thrust) Fzp by which primary movable pulley 30a presses or clamps belt 15 is calculated. Namely, a basic primary-pulley thrust Fzp which is capable of transmitting the torque without causing the belt slip in primary pulley 30 is calculated by using the following formula: $Fzp=\tau Fzs$. Then, target primary pressure Pp0 is calculated based on the basic primary-pulley thrust Fzp. Note that this target primary pressure Pp0 is used for setting line pressure PL as mentioned below. Step-motor command value Ip0step corresponding to this target primary pressure Pp0 is outputted to step motor 10. Thereby, primary pressure Pp is adjusted to target primary pressure Pp0, and target transmission ratio Ip0 is achieved.

(Setting of Line Pressure)

Since line pressure PL is the base pressure for pressures Pp and Ps, there is a premise that line pressure PL is higher than or equal to pressure Pp and also is higher than or equal to pressure Ps. Moreover, line pressure PL is always set at a value higher than one of pressures Pp and Ps by a margin. Under a normal open-loop control for line pressure PL, target line pressure PL0 is calculated by adding after-mentioned predetermined margin pressures $\alpha$ and $\beta$ respectively to higher one of target primary pressure Pp0 and target secondary pressure Ps0, as shown in FIG. 10. This setting is conducted in order to secure pulley pressures Pp and Ps capable of reliably preventing the belt slip, assuming that a pressure loss (pressure difference) might occur due to an oil-passage resistance and the like between line pressure PL and pressures Pp and Ps.

(Balance Thrust Ratio)

Figure 11:
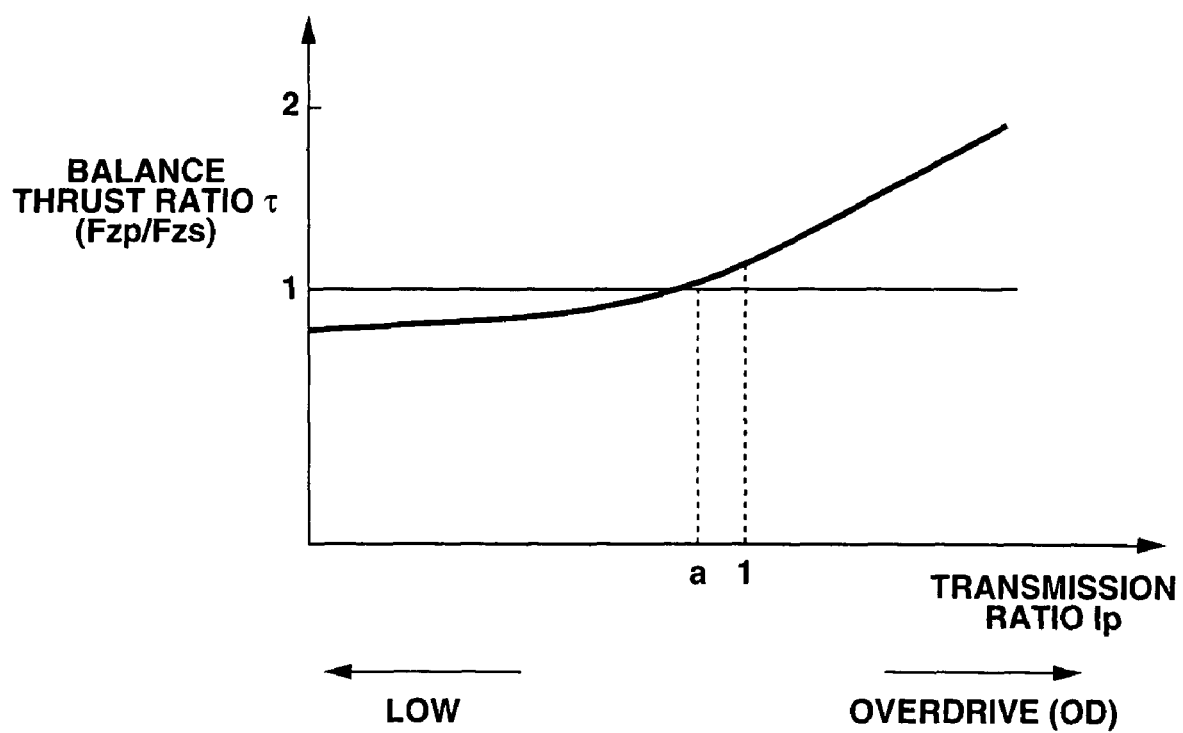
FIG. 11 a map of balance thrust ratio.

FIG. 11 shows a map of balance thrust ratio $\tau=Fzp/Fzs$ with regard to each transmission ratio Ip. Balance thrust ratio $\tau$ represents a balance of pulley thrusts (a relation between primary-pulley thrust Fzp and secondary-pulley thrust Fzs) necessary to maintain a predetermined value of Ip in the case where belt 15 is transmitting a predetermined torque. Namely, balance thrust ratio $\tau$ is a ratio between Fzp and Fzs. In addition, a characteristic of the map of balance thrust ratio $\tau$ is determined from contributing factors such as a belt load and a belt characteristic.

In the shift control for CVT 3, a ratio Rs/Rp between belt winding radiuses of respective pulleys 30 and 31 (i.e., Ip) is varied by varying the balance Fzp/Fzs of pressing forces Fzp and Fzs while securing pressing forces Fzp and Fzs necessary to prevent the belt slip of each pulley 30 or 31.

As shown in FIG. 11, in a low side region of transmission ratio Ip; variations of balance thrust ratio $\tau$ are small, and balance thrust ratio $\tau$ takes values near 1. On the other hand, in an overdrive side region; variations of balance thrust ratio $\tau$ are large, and balance thrust ratio $\tau$ takes values near 2.

(Ip Low Side)

Balance thrust ratio $\tau$ takes a value of approximately 0.8 when transmission ratio Ip is in the lowest side (takes its maximum value). Then, balance thrust ratio $\tau$ varies little and only rises slightly within a range between 0.8 and 1, until transmission ratio Ip becomes in the vicinity of 1. In the low side of Ip, the belt winding radius of primary pulley 30 side becomes small (Rp<Rs). From the following reasons; although primary-pulley thrust Fzp is smaller than secondary-pulley thrust Fzs, the difference between Fzp and Fzs is a slight amount and primary-pulley thrust Fzp is close to secondary-pulley thrust Fzs.

Namely as a first reason, a pulley thrust Fz1 necessary to maintain belt winding radius R requires a lower amount as belt winding radius R becomes smaller. Hence, a pulley thrust Fzp1 of primary pulley 30 side becomes smaller than a pulley thrust Fzs1 of secondary pulley 31 side as belt winding radius Rp of primary pulley 30 side becomes smaller.

As a second reason, a pulley thrust Fz2 necessary to transmit a predetermined torque requires a larger amount as belt winding radius R becomes smaller. Hence, a pulley thrust Fzp2 of primary pulley 30 side becomes larger than a pulley thrust Fzs2 of secondary pulley 31 side as belt winding radius Rp of primary pulley 30 side becomes smaller.

Therefore, when considering a sum of Fz1 and Fz2, the difference between a sum Fzp (=Fzp1+Fzp2) of primary pulley 30 side and a sum Fzs (=Fzs1+Fzs2) of secondary pulley 31 side is small. Note that an upper limit of Fzp2 is suppressed, and hence Fzp scarcely exceeds Fzs in the low side of transmission ratio Ip.

(Ip=1)

When transmission ratio Ip is equal to 1, the belt winding radius becomes equivalent between primary pulley 30 and secondary pulley 31 (Rp=Rs). Accordingly, It is expected that Fzp1 becomes equal to Fzs1, and balance thrust ratio $\tau$ becomes equal to 1. However, pulley thrust Fz2 necessary to transmit a predetermined torque requires a larger amount as the state of Ip becomes from the low side toward the overdrive side, as mentioned below. Hence, Fzp2 is larger than Fzs2 even in the case where Ip is somewhat in a lower side beyond 1. Namely, Fzp (=Fzp1+Fzp2) becomes larger than Fzs (=Fzs1+Fzs2). Accordingly in reality, as shown in FIG. 11; balance thrust ratio $\tau$ becomes somewhat larger than 1 when transmission ratio Ip is equal to 1, and becomes equal to 1 when transmission ratio Ip takes "a" which is in a little lower side than 1.

(Ip Overdrive Side)

Balance thrust ratio $\tau$ increases at a substantially constant rate toward the overdrive side from the vicinity of the point where transmission ratio Ip takes 1. Then, balance thrust ratio $\tau$ becomes in a range between 1.8 and 2 when transmission ratio Ip takes its (minimum) value corresponding to the most overdrive.

In the overdrive side of transmission ratio Ip, belt winding radius Rs of secondary pulley 31 side becomes small (Rp>Rs). Since the overdrive side of Ip is a state where the state in the low side of Ip is reversed, the difference between primary-pulley thrust Fzp and secondary-pulley thrust Fzs is expected to become small from the above-mentioned first and second reasons. Moreover, Fzp (=Fzp1+Fzp2) is expected to scarcely fall below Fzs (=Fzs1+Fzs2).

In the low side of Ip, both of an element pressing force (compression force) of belt 15 and a band tension difference of belt 15 contribute to the torque transmission (torque transfer). However, in the overdrive side of Ip, the band tension difference negatively acts on the torque transmission. Hence in the overdrive side of Ip, a further element pressing force for canceling the negatively-acting band tension difference is necessary. Therefore, a pulley thrust Fz2' additionally necessary to secure the above-mentioned element pressing force requires a larger amount in primary pulley 30 side than in secondary pulley 31 side (Fzp2'>Fzs2').

Accordingly in the overdrive side, Fzp (=Fzp1+Fzp2+Fzp2') does not become below Fzs (=Fzs1+Fzs2+Fzs2'), and the difference between Fzp of primary pulley 30 side and Fzs of secondary pulley 31 side becomes large.

In summary, $\tau$ (=Fzp/Fzs) does not vary so much, and is near 1 (0.8~1) in the low side of Ip. On the other hand, $\tau$ (=Fzp/Fzs) greatly varies in the overdrive side of Ip, and increases until close to 2 (1.8~2) from the area of Ip=1 toward the overdrive side.

(Relation Between Primary Pressure and Secondary Pressure)

Figure 12:
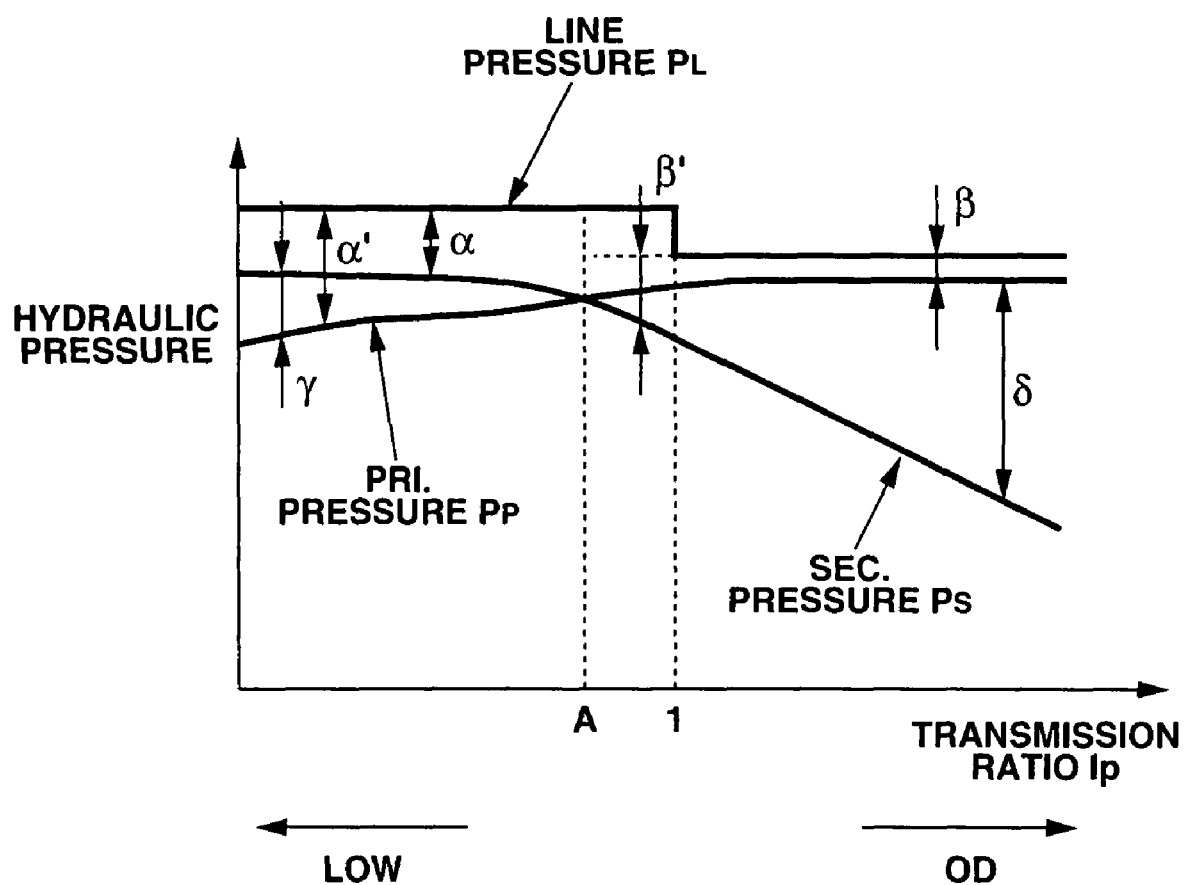
FIG. 12 is a map showing a relation between pulley pressures and the line pressure relative to a transmission ratio.

FIG. 12 is a hydraulic-characteristic map in which balance thrust ratio $\tau$ was converted into the relation between primary pressure Pp and secondary pressure Ps, and line pressure PL is shown together. Pressures Pp and Ps are pulley pressures respectively necessary to transmit the torque while maintaining a predetermined transmission ratio Ip. By varying this balance between pressures Pp and Ps, a predetermined transmission ratio Ip is obtained. Hence, pressures Pp and Ps are calculated from Fzp and Fzs while freely setting an area ratio between primary movable pulley 30a and secondary movable pulley 31a, and thus the relational map shown in FIG. 12 is produced.

As shown in FIG. 12, pressure Pp in the low side of transmission ratio Ip is lower than that in the overdrive side of Ip. Pressure Pp is lowest when the transmission ratio Ip takes its value corresponding to the lowest state (lowest side). In the low side region of Ip, pressure Pp increases more as transmission ratio Ip moves toward the overdrive side. In the overdrive side region of Ip, pressure Pp is substantially constant.

Pressure Ps in the low side of Ip is higher than that in the overdrive side of Ip. Pressure Ps is highest when the transmission ratio Ip takes its value corresponding to the lowest state (lowest side). In the low side region of Ip, pressure Ps is substantially constant. Pressure Ps decreases at a substantially constant rate toward the overdrive side from the proximity of a point where transmission ratio Ip takes a value of "A" located in a lower side than 1 (middle transmission ratio). Pressure Ps takes its lowest value when the transmission ratio Ip takes its value corresponding to the most overdrive state (most overdrive side). Additionally, the "A" of transmission ratio Ip corresponds to "a" shown in FIG. 11.

In the low side region of Ip, a differential pressure γ between pressure Pp and pressure Ps is small although pressure Pp is lower than pressure Ps. Pressure Pp is close to pressure Ps. Pressure Pp accords with pressure Ps when transmission ratio Ip takes the value "A". In the overdrive side beyond "A", pressure Pp is higher than pressure Ps, and a difference b between both pressures is large.

(Relation between Pulley Pressure and Line Pressure)

As shown in the hydraulic characteristic of FIG. 12, pressure Ps higher than pressure Pp is required when transmission ratio Ip is in the low side. Hence, line pressure PL at least equal to or higher than pressure Ps is necessary to be set. On the other hand, there is a fear that the belt slip is caused in the side of primary pulley 30 whose belt winding radius is relatively small. Hence moreover, line pressure PL having a predetermined safety factor (safety margin) against pressure Pp needs to be set in order to prevent the belt slip. In the low side of Ip, pressure Pp is close to pressure Ps, and differential pressure γ between pressure Ps and pressure Pp is small. Since the predetermined safety factor against pressure Pp is larger than differential pressure γ, line pressure PL is set to have predetermined margin pressure α with respect to pressure Ps in the low side of Ip.

In the region between values "A" and 1 of transmission ratio Ip, pressure Pp is higher than pressure Ps. However, the magnitude of line pressure PL set by adding margin pressure a to pressure Ps is sufficient to secure the safety factor against pressure Pp. Therefore, also in this region, line pressure PL is set to have predetermined margin pressure a against pressure Ps.

(Line Pressure Control at the time of Constant Running under Overdrive)

On the other hand, pressure Pp higher than pressure Ps is required when transmission ratio Ip is in the overdrive side. Hence, line pressure PL at least equal to or higher than pressure Pp is necessary to be set. On the other hand, there is a fear that the belt slip is caused in the side of secondary pulley 31 whose belt winding radius is relatively small. Hence moreover, the line pressure PL having a predetermined safety factor (safety margin) against pressure Ps needs to be set in order to prevent the belt slip. In the overdrive side of Ip, pressure Ps is sufficiently low as compared with pressure Pp, and differential pressure δ between pressure Pp and pressure Ps is large. Accordingly, the safety factor of line pressure PL relative to pressure Ps is sufficiently secured by virtue of differential pressure δ, as long as line pressure PL is set at a value higher than or equal to pressure Pp. Therefore, line pressure PL is reduced in the overdrive side.

Namely, margin pressure β of line pressure PL with respect to pressure Pp in the overdrive side can be made smaller as compared with margin pressure a of line pressure PL with respect to pressure Ps in the low side. At minimum, margin pressure β can be made equal to 0. Additionally, the hydraulic characteristic in the map of FIG. 12 is specified so that pressure Ps does not exceed pressure Pp in the overdrive side (i.e., point "A" does not exist in the overdrive side) and differential pressure δ between pressure Pp and pressure Ps is secured when transmission ratio Ip is equal to 1. Therefore, the event is prevented that the belt slip is caused in the side of secondary pulley 31, or pressure Ps becomes incapable of being maintained as a result of reducing line pressure PL up to pressure Pp in the overdrive side.

Hence, line-pressure control section 94 according to the present invention sets line pressure PL having predetermined margin pressure β against pressure Pp, and however brings the magnitude of margin pressure β close to 0. Line-pressure control section 94 controls line pressure PL to allow line pressure PL to substantially accord with pressure Pp. Therefore, at the time of vehicle running under the overdrive, it (the waste) is avoided that line pressure PL is maintained highly by consuming energy for driving oil pump 7 even though the safety factor has been secured as mentioned above. Accordingly, an energy of engine can be saved by unnecessary amount of line pressure PL, and a fuel economy can be improved. Namely, the improvement of fuel economy is achieved by reducing a pumping loss under the overdrive running which occurs frequently in normal running (high in running frequency).

Line pressure PL after carrying out this control of the first embodiment has no margin against pressure Pp, and margin pressure β shown in FIG. 12 becomes substantially equal to 0. Hence, when an upshift command for shifting upwardly from the current target transmission ratio Ip0 is outputted and thereby hydraulic pressure becomes necessary to be supplied to primary-pulley cylinder chamber 30c; line pressure PL needs to be temporarily increased to create the differential pressure between line pressure PL and pressure Pp. Accordingly, there appears to be a concern that a delay in shift (upshift) response occurs as compared with the case where this control is not carried out. However, because of the upshift (overdrive) side, the requirement of quick shift is a little, hence there is no problem. Further with regard to the belt slip at the same time, also there is no problem (the belt slip does not occur) since the belt winding radius Rp of primary pulley 30 side is relatively large.

In this first embodiment, line pressure PL is controlled by regarding the point where transmission ratio Ip is equal to 1, as a boundary as mentioned above. However, line pressure PL may be controlled by regarding the point where transmission ratio Ip is equal to "A" as the boundary as mentioned below. In other words, line pressure PL may be controlled by regarding the point of Ip="A" at which the relation between primary pressure Pp and secondary pressure Ps is changed from Pp<Ps to Pp>Ps, as the boundary. Namely as shown in FIG. 12, line pressure PL is set so as to be higher than or equal to pressure Ps, and also so as to be a value resulting from adding a margin pressure α' to pressure Pp in the side lower than "A". On the other hand, in the overdrive side more than "A", line pressure PL is set so as to be higher than or equal to pressure Pp, and also so as to be a value resulting from adding a margin pressure β' to pressure Ps. Then, margin pressures α' and β' are controlled to cause line pressure PL in the overdrive side beyond "A" to be lower than line pressure PL in the lower side beyond "A". By such line-pressure control, the improvement of fuel economy can be achieved in the similar manner as the above.

[Operations in First Embodiment]
(Control Flowchart)

Figure 13:
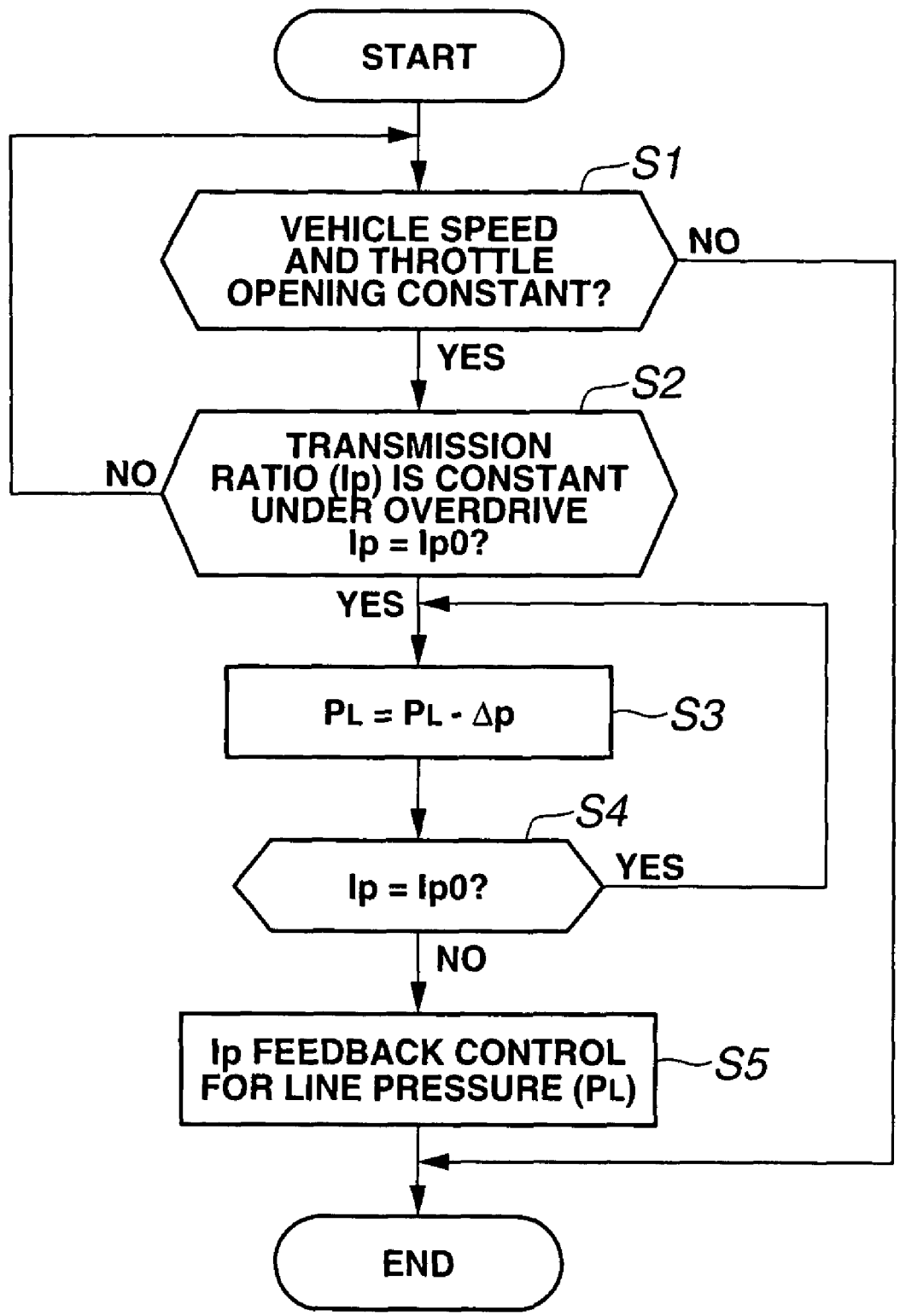
FIG. 13 is a control flowchart in the first, third, and fourth embodiments.

FIG. 13 is a flowchart of the line pressure control (PL control) which is carried out by line-pressure control section 94 in the first embodiment. At steps S1 and S2, it is judged whether or not the vehicle is in the constant running state under overdrive. In the case of overdrive constant running state, the control for reducing line pressure PL up to pressure Pp is conducted at steps S3 to S5.

(Judging Process of Overdrive Constant Running)

At step S1, constant-running judging section 95 judges whether or not the vehicle running state (the vehicle speed and the throttle opening) is constant (i.e., target transmission ratio Ip0 is constant), on the basis of signals derived from vehicle speed sensor 42 and throttle opening sensor 43. If this running state is constant, namely the answer of step S1 is Yes; the program proceeds to step S2. If the answer of step S1 is No; the line pressure control is finished.

At step S2, actual transmission-ratio sensing section 93 determines whether or not actual transmission ratio Ip sensed by transmission ratio sensor 30d is in the overdrive side and also is a steady-state value Ip1 stabilized by the mechanical feedback mechanism of shift control valve 170. The following explanations are given on the assumption that there is no difference between target transmission ratio Ip0 and steady-state transmission ratio Ip1 stabilized by the mechanical feedback, namely on the assumption of Ip0=Ip1. If transmission ratio Ip is stabilized at target transmission ratio Ip0 (=Ip1) in the overdrive side, namely the answer of step S2 is Yes; the program proceeds to step S3. If the answer of step S2 is No; the program returns to step S1. At steps S1 and S2, line pressure PL is controlled to a value obtained by adding margin pressure β to target primary pressure Pp0 which is a primary pressure necessary to maintain target transmission ratio Ip0 (overdrive side), by way of open-loop control.

In the case where the control for reducing line pressure PL to pressure Pp is carried out under the condition where the shift is being carried out by varying pressure Pp with transmission ratio Ip not constant, line pressure PL needs to be varied in response to the variation of pressure Pp. Namely in this case, a special control law for line pressure PL is required during the shift (see fourth embodiment). Therefore in this control of first embodiment; after ascertaining the overdrive constant running state by providing steps S1 and S2, the following PL reducing control (steps S3 to S5) is carried out.

At step S3, line-pressure adjusting section 97 reduces line pressure PL by a predetermined value Δp from is current value, by outputting the command to line-pressure solenoid 100. Then, the program proceeds to step S4.

At step S4, comparing section 96 judges whether or not current transmission ratio Ip is being maintained at target transmission ratio Ip0. If transmission ratio Ip is being maintained at target transmission ratio Ip0, namely the answer of step S4 is Yes; the program returns to step S3. If transmission ratio Ip is deviated from target transmission ratio Ip0, namely the answer of step S4 is No; an after-mentioned PL F/B flag is set to 1, and the program proceeds to step S5. If line pressure PL reduced by value Δp is higher than or equal to pressure Pp0 necessary to maintain target transmission ratio Ip0, target transmission ratio Ip0 is maintained by means of the mechanical feedback mechanism. On the other hand, if line pressure PL reduced by value Δp is lower than pressure Pp0 necessary to maintain target transmission ratio Ip0, target transmission ratio Ip0 is not maintained so that the downshift is caused since the mechanical feedback mechanism does not properly operate (at this time, shift control valve 170 is opened so as to satisfy the relation PL=Pp as mentioned below). Therefore at step S4, the magnitude relation between line pressure PL and pressure Pp is sensed by monitoring transmission ratio Ip.

It is noted that a rapid change of line pressure PL can be avoided by repeatedly reducing line pressure PL by value Δp in a stepwise manner as steps S3 and S4.

(Transmission Ratio Feedback Control for Line Pressure)

At step S5, a transmission-ratio(Ip) feedback control for line pressure PL is carried out. Namely, comparing section 96 compares actual transmission ratio Ip with target transmission ratio Ip0. Then on the basis of this comparison result, line-pressure adjusting section 97 controls line pressure PL by way of feedback control so as to maintain actual transmission ratio Ip at target transmission ratio Ip0 (in other words, so as to maintain pressure PL=Pp at pressure Pp0). Thus at step S5, line pressure PL is adjusted by monitoring transmission ratio Ip but not by directly monitoring line pressure PL.

Concretely at step S5, PI control (proportional-integral control) for line pressure PL is carried out to cause transmission ratio Ip to accord with target transmission ratio Ip0. After calculating a difference ΔIp between Ip0 and Ip, ΔPL is calculated from the following formula: ΔPL={Kp×ΔIp+Ki×∫ΔIpdt}. Note that Kp denotes a proportional gain, and Ki denotes an integral gain. By adding this ΔPL to a previous command pressure PL*(n−1), a this-time-around command pressure PL*(n) is calculated. Then, the calculated command pressure PL*(n) is converted into a current command value which is outputted to line-pressure solenoid 100. It is noted that previous command pressure PL*(n−1) is a previous (last-time around) value during the Ip feedback control for line pressure PL, and a value of command pressure PL* outputted when the open-loop control for line pressure PL is changed to the Ip feedback control for line pressure PL is used as its initial value for the feedback control.

When PL* is lower than Pp0 (i.e., PL*<Pp0); transmission ratio Ip is kept deviated from target transmission ratio Ip0 toward downshift side, since Pp (=PL*) is also lower than Pp0. Hence, the above-routine is repeated by again calculating difference ΔIp until transmission ratio Ip returns to target transmission ratio Ip0. When pressure PL*=Pp converges to target pressure Pp0, transmission ratio Ip reaches or returns to target transmission ratio Ip0. At this time, both of ΔIp and ΔPL become equal to 0. Accordingly, pressure PL*(=PL) is maintained at a value (i.e., Pp0) obtained at the time of above-mentioned returning. At this time, margin pressure β of PL against Pp (=Pp0) is equal to 0.

In the event that target transmission ratio Ip0 is changed because of the change of vehicle running condition (for example, the variation of vehicle speed or accelerator opening, the variation of drive range, or the execution of brake operation) during the Ip feedback control for line pressure PL; the Ip feedback control for line pressure PL is immediately stopped. When stopping the Ip feedback control; PL F/B flag indicating that the Ip feedback control for PL is during execution is made to 0, and target line pressure PL0 is set at a value obtainable by adding margin pressure β (>0) to target primary pressure Pp0. Then, the mechanical feedback mechanism resumes working so as to achieve the relation Ip=Ip0.

Concrete operations of the hydraulic circuit for CVT 3 at the time of execution of the above-mentioned PL control will now be explained referring to FIGS. 4 and 14.

FIG. 4 shows the hydraulic circuit for CVT 3 under the state where transmission ratio Ip is stable at target transmission ratio Ip0 located in the overdrive side by virtue of the mechanical feedback, before executing the PL reducing control (steps S3-S5). Namely FIG. 4 shows the hydraulic circuit for CVT 3 under the overdrive constant running state. Since transmission ratio Ip is in the overdrive side; with regard to the magnitude relation of hydraulic pressure, line pressure PL is the highest and pressure Pp is higher than pressure Ps (PL>Pp>Ps).

In this state, line pressure PL is being maintained higher than pressure Pp. Hence, working fluid is properly resupplied from oil passage 107 to primary-pulley cylinder chamber 30c by the mechanical feedback mechanism. Thereby, transmission ratio Ip is being maintained at target transmission ratio Ip0.

Namely, since working fluid is constantly leaking from primary-pulley cylinder chamber 30c, pressure Pp is gradually reduced. When primary-pulley thrust Fzp becomes incapable of being maintained; primary movable pulley 30a moves in the positive direction of X-axis, and in response to this, also spool 173 of shift control valve 170 moves in the positive direction of X-axis. Accordingly, primary-pulley cylinder chamber 30c becomes communicated with oil passage 107. At this time, since line pressure PL is being maintained higher than pressure Pp, working fluid is supplied to primary-pulley cylinder chamber 30c and hence target pressure Pp0 is maintained. Namely, the ordered target transmission ratio Ip0 is maintained.

In the case where transmission ratio Ip deviates from target transmission ratio Ip0 as a result of reducing line pressure PL, transmission ratio Ip is shifted toward the downshift side unless target transmission ratio Ip0 varies. FIG. 14 shows the hydraulic circuit of CVT 3 during the execution of PL reducing control (steps S3 and S5).

Figure 14:
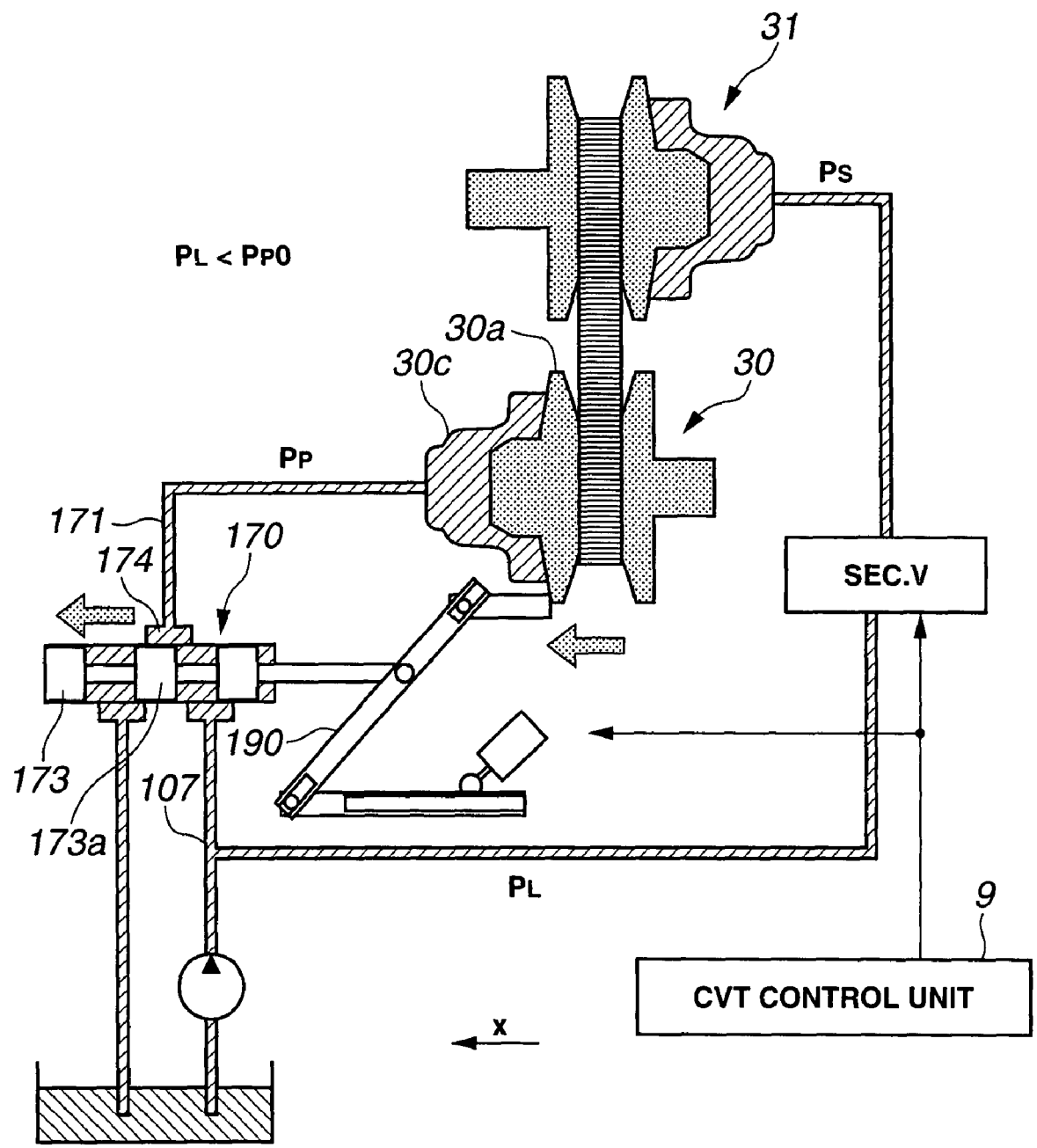
FIG. 14 is a schematic view of the mechanical feedback mechanism (at the time of execution of a line pressure control).

As shown in FIG. 14, when line pressure PL is lower than target pressure Pp0 (PL<Pp0), an oil quantity same as that of the oil leaked from primary-pulley cylinder chamber 30c is not resupplied to primary-pulley cylinder chamber 30c. Accordingly, transmission ratio Ip is not maintained at target ratio Ip0, and deviates toward the downshift side.

Namely, primary movable pulley 30a moves in the positive direction of X-axis, because of the reduction of pressure Pp caused by the working-fluid leakage from primary-pulley cylinder chamber 30c. In response to this, primary-pulley cylinder chamber 30c is made to communicate with oil passage 107 adapted to supply line pressure PL, by link 190. However, since line pressure PL is lower than target pressure Pp0 (PL<Pp0), working fluid is not supplied to primary-pulley cylinder chamber 30c and then it becomes impossible to maintain target pressure Pp0. Accordingly, primary movable pulley 30a is kept under the state deviated in the positive direction of X-axis. Hence, the groove width of primary pulley 30 is widened, and transmission ratio Ip deviates to the downshift side. At this time, primary-pulley cylinder chamber 30c is kept in communication with oil passage 107 so as to satisfy the relation PL=Pp.

When the comparing section 96 of CVT control unit 9 detects this state (step S4), line-pressure adjusting section 97 carries out the Ip feedback control for line pressure PL so as to maintain transmission ratio Ip at target transmission ratio Ip0, by outputting the command to line-pressure solenoid 100 (step S5).

When pressure PL=Pp is returning to target primary pressure Pp0 necessary to maintain target transmission ratio Ip0; primary movable pulley 30a moves in the negative direction of X-axis, and the groove width of primary pulley 30 is narrowed. Thereby, transmission ratio Ip deviated to the downshift side comes to return to target transmission ratio Ip0 namely toward the upshift side. At this time, spool 173 is moved in the negative direction of X-axis through link 190, and the communication between primary-pulley cylinder chamber 30c and oil passage 107 is gradually shut off. When transmission ratio Ip has returned to or reached target transmission ratio Ip0, and its current state is maintained; spool 173 is placed in its neutral position, and land portion 173a shuts off Pp supplying port 174 to cause oil passage 171 to become not communicated to oil passage 107.

When transmission ratio Ip becomes maintained at target transmission ratio Ip0 as mentioned above, line pressure PL is approximately equal to pressure Pp. (PL≈Pp=Pp0). Thus, line-pressure control section 94 according to this first embodiment reduces line pressure PL up to pressure Pp during the overdrive running, while keeping transmission ratio Ip at target transmission ratio Ip0.

[Structures and Effects According to First Embodiment]

In the hydraulic control apparatus for CVT according to the first embodiment, the below-listed effects are produced.

(1) The hydraulic control apparatus for CVT according to the first embodiment includes line-pressure control section 94 configured to produce line pressure PL by adjusting the discharge pressure of oil pump 7; a primary pressure control section (primary-pressure adjusting section 91 and the mechanical feedback mechanism) configured to adjust primary pressure Pp for being supplied to primary pulley 30, on the basis of line pressure PL; and a secondary pressure control section (secondary-pressure adjusting section 92 and SEC.V 140) configured to adjust secondary pressure Ps for being supplied to secondary pulley 31, on the basis of line pressure PL. Further, line-pressure control section 94 includes a line-pressure control subsection (comparing section 96 and steps S1 to S3 conducted by line-pressure adjusting section 97) configured to adjust line pressure PL to a value set by adding margin pressure α or β to higher one of primary pressure Pp and secondary pressure Ps, and to reduce margin pressure β when primary pressure Pp is higher than secondary pressure Ps (or, transmission ratio Ip is in the overdrive side smaller than 1).

According to the above structure; there is an advantage that the fuel economy can be improved by reducing the difference between line pressure PL and primary pressure Pp, and thereby reducing the pumping loss (unnecessary operation power for the pump), at the time of the overdrive during which line pressure PL can be reduced without the fear that the belt slip is caused.

(2) Further, the hydraulic control apparatus according to the first embodiment includes actual transmission-ratio sensing section 93 adapted to sense actual transmission ratio Ip; the above-mentioned primary pressure control section includes shift control valve 170 adapted to adjust (open or close) the communication between oil passage 107 for supplying line pressure PL and oil passage 171 for supplying primary pressure Pp to primary pulley 30, and is configured to adjust primary pressure Pp to its value Pp0 for achieving target transmission ratio Ip0 by controlling the opening of shift control valve 170; and the above-mentioned line-pressure control subsection is configured to carry out Ip feedback control to adjust line pressure PL so as to achieve target transmission ratio Ip0 on the basis of the sensed actual transmission ratio Ip, after the above-mentioned primary pressure control section becomes incapable of achieving target transmission ratio Ip0 due to the reduction of line pressure PL adjusted to the value set by adding margin pressure β.

Further, the above-mentioned primary pressure control section can employ the mechanical feedback mechanism including the drive source adapted to output the driving amount according to target transmission ratio Ip0, and the link mechanism adapted to provide the opening of shift control valve 170 in accordance with the driving amount and the groove width of primary pulley 30; and the mechanical feedback mechanism is adapted to adjust primary pressure Pp to bring the groove width of primary pulley 30 to its value for achieving target transmission ratio Ip0.

Further, the drive source is step motor 10 adapted to output the rotational step number according to target transmission ratio Ip0 as the driving amount; the above-mentioned link mechanism includes first rod 194 adapted to extend or contract according to the rotational step number, transmission ratio sensor 30d connected with primary movable pulley 30a and adapted to extend or contract according to the groove width of primary pulley 30, link 190 connecting first rod 194 with transmission ratio sensor 30d, and second rod 193 connecting the middle portion of link 190 with spool 173 of shift control valve 170.

In a comparative example of hydraulic control method in which the mechanical feedback mechanism for setting target transmission ratio Ip0 in accordance with the command signal for step motor is used, the mechanical feedback is carried out without monitoring line pressure PL on the assumption that line pressure PL is higher than or equal to pressure Pp. Hence, hydraulic pressure becomes incapable of being supplied to primary-pulley cylinder chamber 30c and thereby the mechanical feedback becomes impossible, when line pressure PL is reduced to a level lower than target primary pressure Pp0 necessary to maintain target transmission ratio Ip0. Therefore in such comparative example, there has been the limitation that line pressure PL cannot be reduced up to pressure Pp while maintaining transmission ratio Ip at target transmission ratio Ip0. On the other hand, the hydraulic control apparatus in this first embodiment includes the PL feedback control law for preventing line pressure PL from being lowered below target pressure Pp0. Hence, line pressure PL can be reduced to the proximity of pressure Pp while maintaining transmission ratio Ip at target transmission ratio Ip0, and thus line pressure PL can be set to its bare minimum of hydraulic pressure. Therefore, in the hydraulic control apparatus for CVT in which the step motor system is used as a regulating method for pulley pressure; there is the advantage that the fuel economy can be improved by reducing the difference between line pressure PL and pressure Pp, thereby reducing the pumping loss at the time of overdrive.

(3) In the hydraulic control apparatus for CVT according to the first embodiment; line pressure PL is adjusted to the value set by adding margin pressure β to primary pressure Pp, and margin pressure β is brought close to 0, when the vehicle is in the steady state where transmission ratio Ip is constant (Ip=Ip1=Ip0).

When the control for reducing line pressure PL up to pressure Pp is carried out under the state where the shift is being carried out by varying pressure Pp with transmission ratio Ip not constant, line pressure PL needs to be varied in response to the variation of pressure Pp. In the case where energy is consumed due to such variation of line pressure PL, there is the fear of worsening the fuel economy as opposite effect.

Therefore, in the hydraulic control apparatus according to this first embodiment; there is the advantage that the fuel economy can be reliably improved at the time of overdrive running, by carrying out the PL control upon the confirmation of the overdrive constant-running state.

Second Embodiment

A hydraulic control apparatus for CVT in a second embodiment according to the present invention carries out the transmission-ratio feedback control for line pressure PL, in the similar manner as the first embodiment. However unlike the first embodiment, the hydraulic control apparatus in the second embodiment carries out the transmission-ratio feedback control for line pressure PL, after bringing transmission ratio Ip to target transmission ratio Ip0 by correcting the command signal for step motor 10 when transmission ratio Ip realized (obtained) by the mechanical feedback mechanism has a deviation from target transmission ratio Ip0.

[Configurations in Second Embodiment]

Configurations of the automatic transmission and the hydraulic control apparatus in the second embodiment are similar as the first embodiment, except the following points. Line-pressure control section 94 according to the second embodiment outputs a command based on the comparison result of comparing section 96 to primary-pressure adjusting section 91, so as to correct the command signal (step-motor command value Ip0step) for step motor 10. Primary-pressure adjusting section 91 outputs the corrected command signal to step motor 10.

[Operations according to Second Embodiment]

In the hydraulic control apparatus of the first embodiment; there is a possibility that target transmission ratio Ip0 cannot be obtained despite the execution of the Ip feedback control for line pressure PL, in the case where transmission ratio Ip actually realized by the mechanical feedback mechanism deviates from target transmission ratio Ip0 corresponding to the command signal for step motor 10 (step-motor command value Ip0step). The hydraulic control apparatus according to the second embodiment can reliably attain target transmission ratio Ip0 by carrying out the Ip0 feedback control for line pressure PL, after correcting the above-mentioned command signal so as to cause transmission ratio Ip to accord with target transmission ratio Ip0.

(Control Flowchart)

Figure 15:
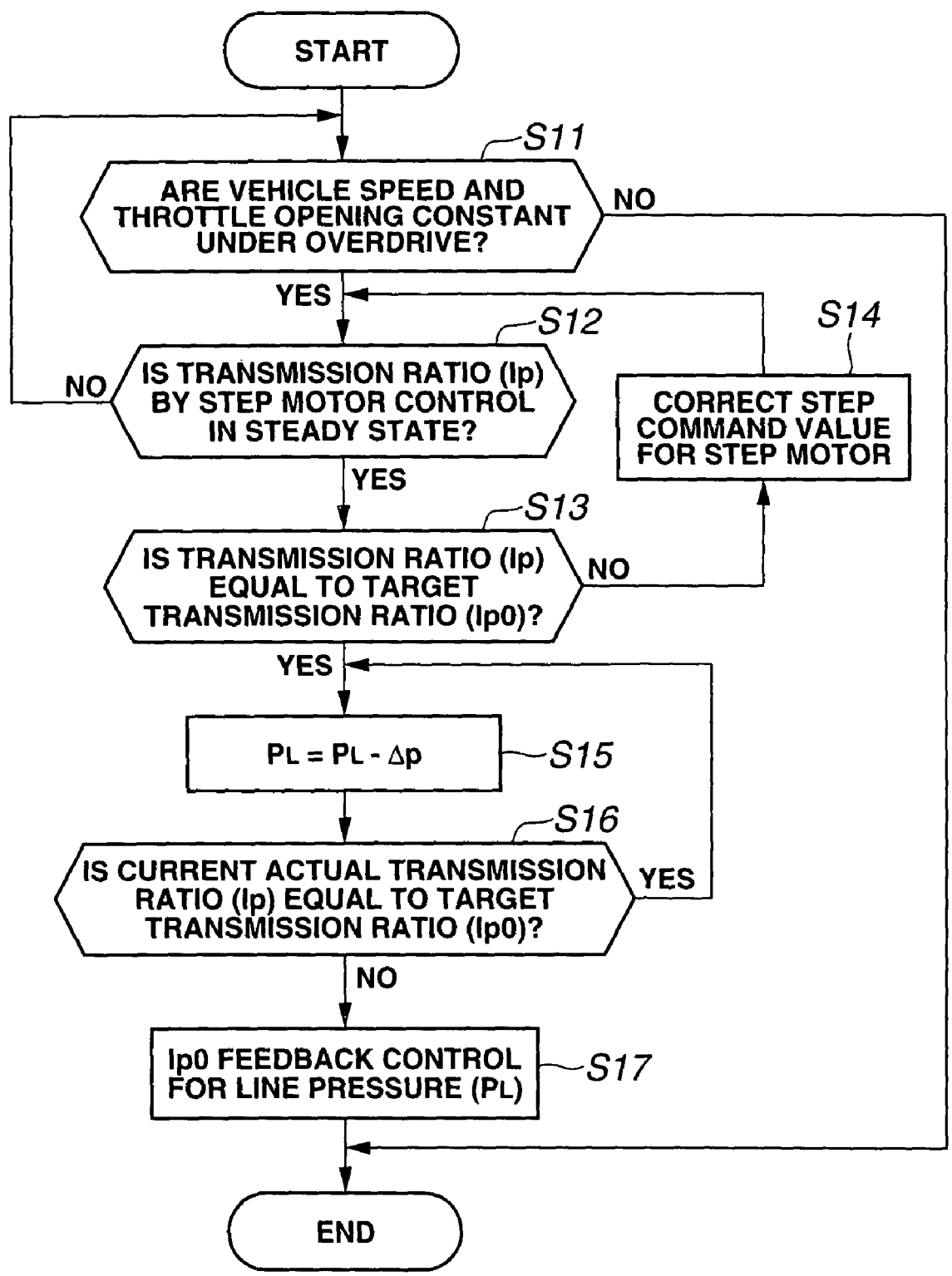
FIG. 15 is a control flowchart in the second embodiment.

FIG. 15 is a flowchart of the line pressure control (PL control) which is carried out by line-pressure control section 94 in the second embodiment. At steps S11 and S12, it is judged whether or not the vehicle is in the constant running state under overdrive. At steps S13 and S14, line-pressure control section 94 judges whether or not transmission ratio Ip has a deviation from target transmission ratio Ip0. If it is determined that transmission ratio Ip has the deviation from target transmission ratio Ip0, line-pressure control section 94 causes transmission ratio Ip to become equal to target transmission ratio Ip0 by correcting step-motor command value Ip0step. Then, if the vehicle is in the overdrive constant running state, and transmission ratio Ip is equal to target transmission ratio Ip0; the control for reducing line pressure PL up to pressure Pp is conducted at steps S15 to S17.

(Judging Process for Overdrive Constant Running)

At step S11, constant-running judging section 95 judges whether or the vehicle running state (vehicle speed and throttle opening) is constant. Moreover, actual transmission-ratio sensing section 93 determines whether or not transmission ratio Ip sensed by transmission ratio sensor 30d is a value located in the overdrive side. If the running state is constant and also transmission ratio Ip is in the overdrive side, namely the answer of step S11 is Yes; the program proceeds to step S12. If the answer of step S11 is No; this line pressure control is finished.

At step S12, actual transmission-ratio sensing section 93 determines whether or not transmission ratio Ip is a steady-state value Ip1 realized by the mechanical feedback mechanism. If in steady state, namely the answer of step S12 is Yes; the program proceeds to step S13. If in not steady state, namely the answer of step S12 is No; the program returns to step S11.

At step S13, comparing section 96 judges whether or not steady-state value Ip1 is identical with target transmission ratio Ip0. If the difference between steady-state value Ip1 and target transmission ratio Ip0 is larger than or equal to a predetermined value above which the correction needs to be executed, the program proceeds to step S14. If the difference between steady-state value Ip1 and target transmission ratio Ip0 is smaller than the above-mentioned predetermined value, the program proceeds to step S15.

At step S14, primary-pressure adjusting section 91 corrects step-motor command value Ip0step in order to cause transmission ratio Ip to become equal to target transmission ratio Ip0, and then outputs the corrected command value Ip0step to step motor 10. Then, the program returns to step S12.

Steps S15 to S17 are same as steps S3 to S5 in the first embodiment.

[Structures and Effects according to Second Embodiment]

The line-pressure control subsection (primary-pressure adjusting section 91, comparing section 96, and steps S13 to S17 conducted by line-pressure adjusting section 97) according to the second embodiment is configured to bring actual transmission ratio Ip equal to target transmission ratio Ip0 by correcting the command signal (rotational step number) for step motor 10, when actual transmission ratio Ip produced by the mechanical feedback mechanism has a deviation from target transmission ratio Ip0. The actual transmission ratio, i.e., the rotational-speed ratio can be calculated based on detection values derived from a primary rotational-speed sensor and a secondary rotational-speed sensor, as discussed in the third embodiment. Then, the line-pressure control subsection reduces line pressure PL adjusted to the value set by adding margin pressure β, and then carries out the Ip feedback control for line pressure PL.

According to the above structure; there is an advantage that target transmission ratio Ip0 can be reliably achieved and hence the control accuracy can be improved in the hydraulic control apparatus for CVT employing the step motor system as the regulating system for pulley pressure, while improving the fuel economy by reducing the difference between line pressure PL and primary pressure Pp at the time of overdrive.

Third Embodiment

A hydraulic control apparatus for CVT in a third embodiment according to the present invention employs so-called both-pressure regulating method in which both of pressure Pp and pressure Ps are adjusted, in the same manner as the first and second embodiments. However unlike the first and second embodiments (step-motor type control) in which primary pressure Pp is adjusted by using the shift control valve connected to the step motor, pressures Pp and Ps are adjusted by using solenoid-controlled shift control valves (direct-acting type control). Namely, a primary valve (PRI.V) 180 and secondary valve (SEC.V) 140 are controlled by command signals for a primary-pressure solenoid 210 and secondary-pressure solenoid 160; and thereby pressures Pp and Ps are adjusted. The predetermined transmission ratio Ip is obtained by varying the balance between pressure Pp and pressure Ps.

[Configurations in Third Embodiment]

The automatic transmission and its control system in the third embodiment are similar as the first and second embodiments, except the following points (see FIGS. 1 and 2).

(Configuration of Hydraulic Circuit)

Figure 16:
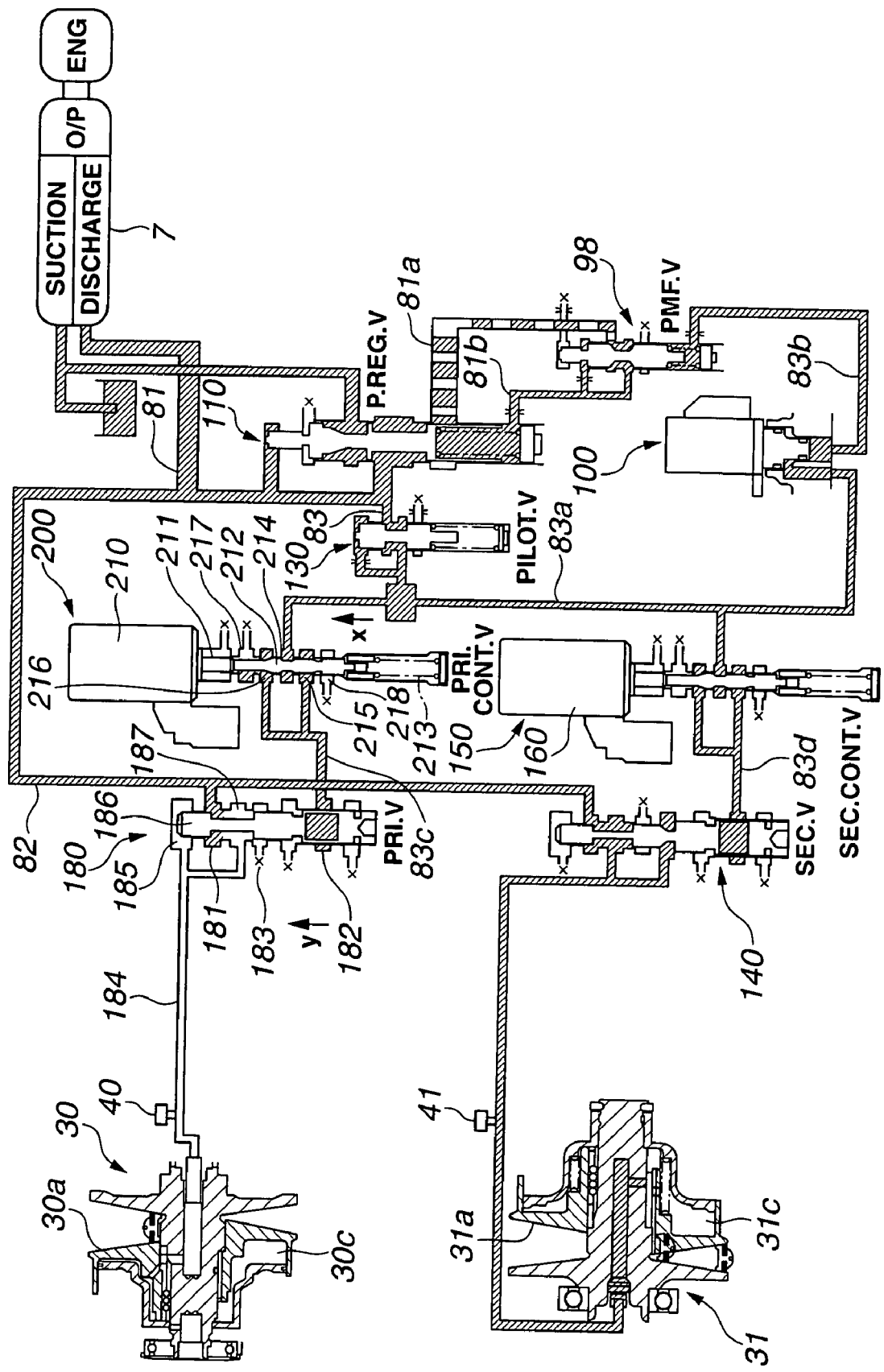
FIG. 16 is a hydraulic circuit diagram of a direct-acting type system.

FIG. 16 shows a hydraulic circuit for CVT 3 in the third embodiment. The discharge pressure of oil pump 7 is supplied through an oil passage 81 to pressure regulator valve (P.REG.V) 110, and is regulated as line pressure PL. Oil passage 81 communicates with oil passages 82 and 83. Oil passage 82 is connected with primary valve (PRI.V) 180 for supplying pressure Pp and secondary valve (SEC.V) 140 for supplying pressure Ps. Oil passage 83 is connected with pilot valve (PILOT.V) 130.

PILOT.V 130 serves to supply the pilot pressure which is a base pressure for signal pressures. The pilot pressure is supplied through an oil passage 83a to a primary control valve (PRI.CONT.V) 200 serving as a proportional control valve on primary pulley side, to secondary control valve (SEC.CONT.V) 150 serving as a proportional control valve on secondary pulley side, and to line-pressure solenoid 100.

A relief pressure of P.REG.V 110 is supplied through an oil passage 81a to a pressure modifier valve (PMF.V) 98. The relief pressure supplied to PMF.V 98 is adjusted by a signal pressure derived from line-pressure solenoid 100 operated based on the pilot pressure. Thus, PMF.V 98 regulates line pressure PL by operating the back pressure of P.REG.V 110 through an oil passage 81b.

Now, actuations of PRI.CONT.V 200 and SEC.CONT.V 150 will be explained below. Since basic actuations of primary pulley side are same as those of secondary pulley side, the following explanations are described only with respect to PRI.CONT.V 200.

PRI.CONT.V 200 includes primary-pressure solenoid 210 adapted to move a spool driving shaft (rod) 211 in proportion to an electric-current command value derived from CVT control unit 9. A spool 212 for switching oil passages is provided in PRI.CONT.V 200. For illustrative purposes; X-axis is provided in an axial direction of spool 212, and a primary-pressure solenoid 210's side relative to spool 212's position is defined as a positive direction of the X-axis. A spring 213 is provided in the negative side of X-axis relative to spool 212. Spring 213 urges (energizes) spool 212 in the positive direction of X-axis.

In a cylinder enclosing or housing spool 212, there are provided an input port 214 through which the pilot pressure is inputted from PILOT.V 130, a port 215 communicating with an oil passage 83c for supplying hydraulic pressure to PRI.V 180, a port 216 through which a feedback pressure of oil passage 83c is inputted, and drain ports 217 and 218. Namely, the cylinder is formed with input port 214, port 215, port 216, and drain ports 217 and 218.

Spool 212 receives the urging force in the negative direction of X-axis which is produced by primary-pressure solenoid 210, the urging force in the negative direction of X-axis which is caused by the feedback pressure supplied from port 216, and the urging force in the positive direction of X-axis which is produced by spring 213. According to a balance of these urging forces, a drain quantity is determined, and thereby a back pressure of PRI.V 180 is determined.

PRI.V 180 adjusts line pressure PL supplied from P.REG.V 110, and supplies pressure Pp to primary-pulley cylinder chamber 30c. In a cylinder of PRI.V 180 which houses a spool 186 of PRI.V 180, there are provided a signal-pressure supplying (receiving) port 182, a line-pressure supplying port

181, a port 187 adapted to communicate with an oil passage 184 for supplying hydraulic pressure Pp to primary-pulley cylinder chamber 30c, a port 185 adapted to receive a feedback pressure of oil passage 184, and a drain port 183. Line pressure PL adjusted by P.REG.V 110 is supplied through oil passage 82 to line-pressure supplying port 181 of PRI.V 180. Hydraulic pressure (signal pressure) adjusted by PRI.CONT.V 200 is supplied through oil passage 83c to signal-pressure supplying port 182 as the back pressure of PRI.V 180.

For illustrative purposes; Y-axis is provided in an axis direction of spool 186, and the port 185's side relative to signal-pressure supplying port 182's position is defined as a positive direction of the Y-axis. Spool 186 receives an urging (biasing) force which is caused by the feedback pressure inputted to port 185 and which acts in the negative direction of the Y-axis, and an urging force which is caused by the signal pressure supplied to signal-pressure supplying port 182 and which acts in the positive direction of the Y-axis. According to a balance of these urging forces, a drain quantity is determined, and thereby primary pressure Pp to be supplied to oil passage 184 is determined.

Namely, as the signal pressure supplied to signal-pressure supplying port 182 becomes higher; spool 186 is displaced more in the positive direction of Y-axis, and thereby line-pressure supplying port 181 is opened more widely while closing drain port 183 more greatly (narrowly) at the same time. Thus, oil amount to be supplied from PRI.V 180 through oil passage 184 to primary-pulley cylinder chamber 30c is increased. On the other hand, as the signal pressure supplied to signal-pressure supplying port 182 becomes lower; the opening degree of line-pressure supplying port 181 is more reduced while increasing the opening degree of drain port 183 at the same time. Thus, oil amount to be supplied from PRI.V 180 to primary-pulley cylinder chamber 30c is decreased.

In the similar manner as PRI.V 180, hydraulic pressure adjusted by SEC.CONT.V 150 is supplied through an oil passage 83d as the back pressure of SEC.V 140. SEC.V 140 adjusts line pressure PL supplied from P.REG.V 110, and supplies pressure Ps to secondary-pulley cylinder chamber 31c.

(Configuration of Electronic Control System)

The electronic control system according to the third embodiment is similar as the first embodiment (see FIG. 9). However, the electronic control system in the third embodiment includes a primary pressure sensor 40 for sensing pressure Pp, and primary-pressure solenoid 210 instead of step motor 10, unlike the first embodiment. Further, this electronic control system includes a primary rotational-speed sensor and a secondary rotational-speed sensor (not shown) as transmission ratio sensor 30d. Actual transmission-ratio sensing section 93 calculates the actual transmission ratio (Ip) on the basis of a ratio between rotational speeds sensed by these rotational-speed sensors.

(Adjustment of Primary Pressure)

Figure 17:
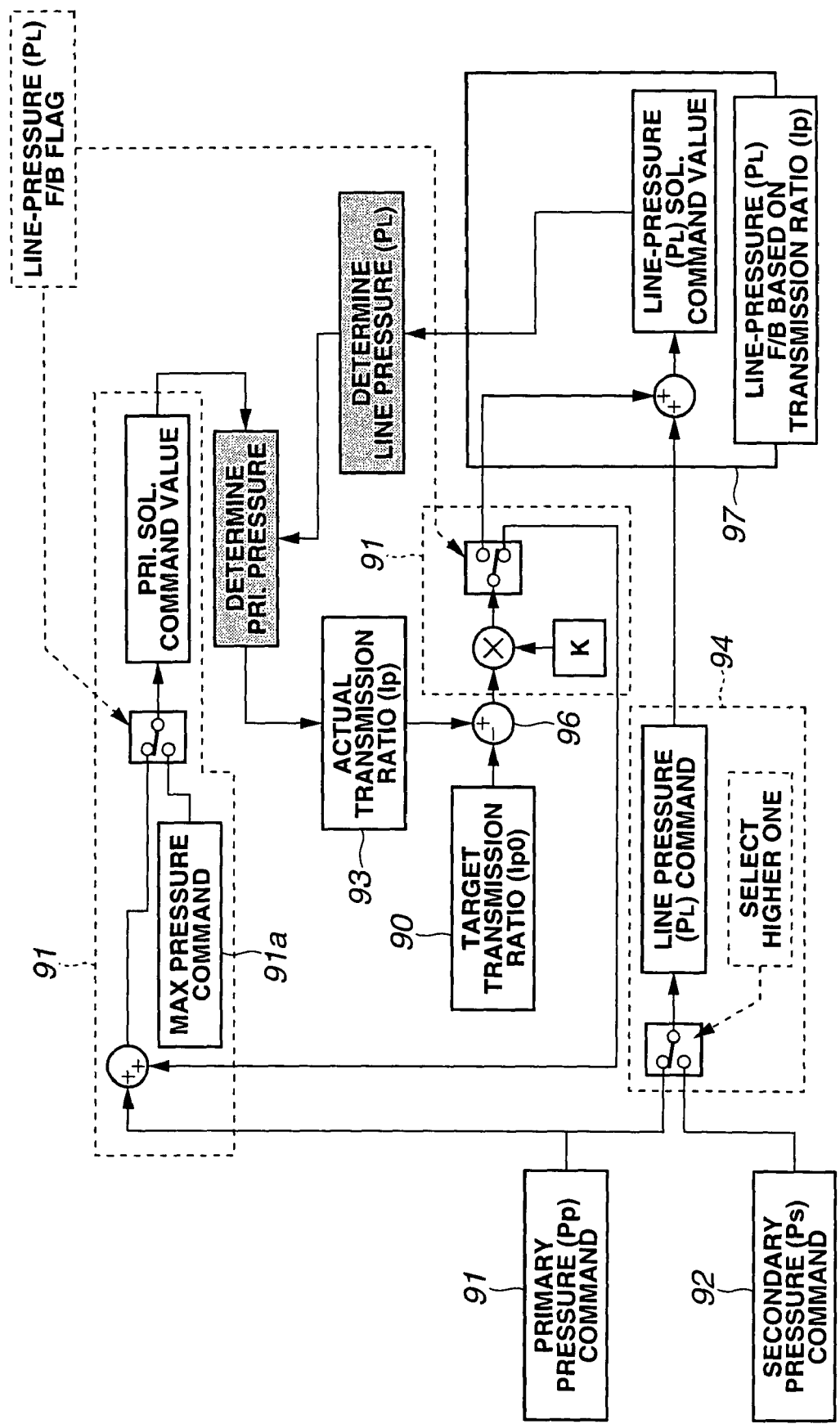
FIG. 17 is a control block diagram in the third embodiment.

FIG. 17 is a control block diagram in the third embodiment. Primary pressure adjusting section 91 sets a command pressure Pp* corresponding to the calculated target pressure Pp0, and outputs the command electric-current corresponding to the command pressure Pp* to primary-pressure solenoid 210. The actuation of primary-pressure solenoid 210 based on the command electric-current is converted into the back pressure of PRI.V 180 namely the signal pressure. The signal pressure causes spool 186 of PRI.V 180 to move, and thereby the opening degree of line-pressure supplying port 181 is controlled.

Moreover, primary pressure adjusting section 91 corrects command pressure Pp* by way of feedback control (correction) on the basis of the value of actual primary pressure Pp sensed by primary pressure sensor 40. Concretely, PI control (proportional-integral control) for primary pressure Pp is carried out after confirming that PL F/B flag is 0 (status) namely that Ip feedback control for line pressure PL is not during execution. At first, a ΔPp is calculated from the following formula: ΔPp=(Pp*−Pp). Then, a this-time-around command pressure Pp*(n) is calculated from the following formula: Pp*(n)=Pp*(n−1)+{Kp×ΔPp+Ki×∫ΔPpdt}. Then, the opening degree of line-pressure supplying port 181 is adjusted according to the above-mentioned correction of command pressure Pp*, and primary pressure Pp conforming to the corrected command pressure Pp* is supplied to primary-pulley cylinder chamber 30c.

In the similar manner, secondary-pressure adjusting section 92 also adjusts secondary pressure Ps by outputting the command current corresponding to command pressure Ps* to secondary-pressure solenoid 160. Moreover, secondary-pressure adjusting section 92 corrects command pressure Ps* by way of feedback control (correction) on the basis of the value of actual secondary pressure Ps sensed by secondary pressure sensor 41. Note that secondary pressure sensor 41 may be provided or used simply as a hydraulic-pressure switch for sensing whether or not secondary pressure Ps is higher than or equal to a predetermined pressure, namely the structure for controlling secondary pressure Ps by way of open (loop) control without correcting command pressure Ps* may be employed.

(Transmission-Ratio Feedback Correction for Primary Pressure)

Since pressures Pp and Ps are controlled independently of each other as mentioned above, there is no guarantee that the achieved transmission ratio Ip reliably becomes target transmission ratio Ip0. Hence, primary pressure adjusting section 91 further adds the correction to command pressure Pp* which has been corrected by the feedback control based on the above-mentioned sensed value of Pp, on the basis of the sensed value Ip of actual transmission-ratio sensing section 93. Namely in the similar manner as the above-mentioned Ip feedback control for PL, primary pressure Pp is adjusted by correcting command pressure Pp* by way of feedback control (correction) on the basis of a difference ΔIp between the sensed actual transmission ratio Ip and target transmission ratio Ip0, to maintain transmission ratio Ip at target transmission ratio Ip0.

Concretely, PI control (proportional-integral control) for primary pressure Pp is carried out to bring transmission ratio Ip closer to target transmission ratio Ip0, after confirming that PL F/B flag is 0 (status) namely that Ip feedback control for line pressure PL is not during execution. At first, a ΔPp* is calculated from the following formula: ΔPp*={Kp×ΔIp+Ki×∫ΔIpdt}. Then, a this-time-around command pressure Pp*(n) is calculated from the following formula: Pp*(n)=Pp*(n−1)+ΔPp*. Thereby in response to the above-mentioned correction of command pressure Pp*, primary pressure Pp capable of assuredly achieving target transmission ratio Ip=Ip0 is supplied to primary-pulley cylinder chamber 30c. It is noted that Pp*(n−1) is a previous (last-time around) command pressure during the Ip feedback control for primary pressure Pp, and a value of command pressure Pp* which has been corrected by the feedback control based on the above-mentioned sensed value of Pp is used as its initial value for this additional feedback control (correction).

[Operations According to Third Embodiment]

In the hydraulic control apparatus for CVT 3 in the third embodiment; line pressure PL is brought close to primary pressure Pp by using the Ip feedback control for line pressure PL in the same manner as the first and second embodiments.

(Control Flowchart)

A flowchart of the line pressure control (PL control) which is carried out by line-pressure control section 94 in the third embodiment is similar as the first embodiment (FIG. 13) except the following points.

At step S2, actual transmission-ratio sensing section 93 determines whether or not the sensed actual transmission ratio Ip is in the overdrive side and also is steady-state value Ip1 (=Ip0) stabilized by the controls for pressures Pp and Ps.

At step S3, line pressure PL is reduced. Primary-pressure adjusting section 91 resupplies working fluid to primary pulley 30 by controlling the opening of line-pressure supplying port 181 so as to compensate for the reduction (amount) of line pressure PL. Thereby, the relation Pp=Pp0 (Ip=Ip0) is maintained. However, when line pressure PL decreases below or equal to target primary pressure Pp0, the differential pressure between oil passages 82 for supplying pressure PL and oil passage 184 for supplying pressure Pp becomes equal to 0. Thus, it becomes impossible to resupply working fluid to primary pulley 30 by the differential pressure (PL−Pp) even if the opening of line-pressure supplying port 181 is increased. Accordingly, primary pressure Pp becomes lower than or equal to target primary pressure Pp0.

Namely, when PL<Pp0, signal pressure Pp*=Pp0 of signal-pressure supplying port 182 is higher than feedback pressure Pp (<Pp0) of port 185 of PRI.V 180. Hence, spool 186 is displaced at maximum degree in the positive direction of the Y-axis, and thereby opens line-pressure supplying port 181 and also shuts off drain port 183 (see FIG. 16). Accordingly, oil passages 82 is maintained in communication with oil passage 184 so that line pressure PL becomes equal to primary pressure Pp (<Pp0). Therefore, after this time point, line-pressure control section 94 carries out the Ip feedback control for PL (step S5) in place of the control for Pp carried out by primary-pressure adjusting section 91.

(Transmission-ratio Feedback Control for Line Pressure)

At step S5, line pressure PL is controlled by way of feedback to cause transmission ratio Ip to become equal to target transmission ratio Ip0 in the similar manner as the first embodiment. Namely, the feedback control for line pressure PL is conducted to cause pressure PL=Pp to become equal to target primary pressure Pp0. When pressure PL=Pp converges to target pressure Pp0, transmission ratio Ip reaches or returns to target transmission ratio Ip0. At this time, both of ΔIp and ΔPL become equal to 0. Accordingly, pressure PL is maintained at the value Pp0 obtained at the time of above-mentioned returning. At this time, margin pressure β of PL (=Pp0) against Pp (=Pp0) is equal to 0. Thus, line pressure PL is reduced up to primary pressure Pp during the overdrive, while maintaining transmission ratio Ip at target transmission ratio Ip0.

Here at step S5, primary-pressure adjusting section 91 sets command pressure Pp* at a maximum pressure command Pp*max, during the Ip feedback control for PL (when PL F/B flag is 1). Thereby, the opening of line-pressure supplying port 181 is fixed to its maximum. Namely, the state is fixed where spool 186 is displaced at maximum degree in the positive direction of the Y-axis. The purpose in stopping the primary pressure's control using PRI.V 180 in this manner is to prevent a fear that a control result might diverge in the case where two different feedback controls are carried out for the same parameter (PP).

Additionally, if the running state is changed during the above-mentioned Ip feedback control for line pressure PL and thereby target transmission ratio Ip0 is changed; the Ip feedback control for line pressure PL is immediately stopped (suspended). When stopping this control; PL F/B flag is set to 0, and line pressure PL is set at a value obtained by adding margin pressure β (>0) to target primary pressure Pp0 (open control). At the same time, primary-pressure adjusting section 91 restarts the normal control for primary pressure Pp, and set Pp* to Pp0 to achieve the relation Ip=Ip0.

Here, by adjusting a gradient of the increase of line pressure PL, the variation of primary pressure Pp at the time of this control switching can be suppressed to the minimum. This is because the feedback pressure-adjustment is conducted by PRI.V 180. Moreover with regard to secondary pressure Ps, secondary-pressure adjusting section 92 continues the normal control for secondary pressure Ps throughout before and after the Ip feedback control for PL (i.e., before, through, and after the Ip feedback control for PL).

[Structures and Effects according to Third Embodiment]

In the hydraulic control apparatus according to the third embodiment, a hydraulic control valve whose opening is controlled by the signal pressure outputted according to Ip0 (Pp0) is employed as PRI.V 180. Namely, this signal pressure moves spool 186 of PRI.V 180, and thereby the opening of line-pressure supplying port 181 is controlled.

In a hydraulic control apparatus for CVT using the hydraulic control for the regulator (adjustment) valve for pulley pressure Pp, line pressure PL can be reduced up to primary pressure Pp while maintaining transmission ratio Ip at target transmission ratio Ip0 at the time of overdrive. Namely, line pressure PL can be set to its minimum necessary hydraulic pressure. Therefore, there is an advantage that the fuel economy can be improved by reducing the difference between line pressure PL and pressure Pp and thereby reducing the pumping loss at the time of overdrive.

Primary-pressure adjusting section 91 fixes the opening of PRI.V 180 to its maximum (for the entire time) during the execution of Ip feedback control for PL, and thereby causes oil passages 82 to communicate with oil passage 184. Thus by stopping the primary pressure's control using PRI.V 180; the Ip feedback control for PL=Pp is prevented from diverging, and the control accuracy can be enhanced.

Fourth Embodiment

A hydraulic control apparatus for CVT in a fourth embodiment according to the present invention is applied to the step-motor type control. In the similar manner as the first and second embodiments, line pressure PL is reduced during the state of overdrive constant running, and then is made to become equal to primary pressure Pp by carrying out the Ip feedback control for PL. However unlike the first and second embodiments, oil passage 107 for supplying pressure PL is made in communication with oil passage 171 for supplying pressure Pp, during the Ip feedback control for PL by adjusting the opening of shift control valve 170 in the fourth embodiment.

In the first and second embodiments, it is a purpose to satisfy the relation PL=Pp (=Pp0) when transmission ratio Ip becomes equal to target transmission ratio Ip0 by means of the Ip feedback control for PL. However, shift control valve 170 is adapted to completely close or shut off the communication between oil passage 107 and oil passage 171 (namely, shift control valve 170 is completely closed) when transmission ratio Ip returns to target transmission ratio Ip0. Hence, there is a fear that line pressure PL does not actually become equal to primary pressure Pp (=Pp0), namely becomes slightly higher than primary pressure Pp (=Pp0), and thereby the fuel economy is not improved by just that much. Namely, immediately before the relation Ip=Ip0 is established; spool 173 of shift control valve 170 is located immediately anterior to the position for completely shutting off the communication between the above two oil passages 107 and 171, and a slight clearance (path) exists between oil passages 107 and 171. Then, working fluid is supplied from oil passage 107 through the above-mentioned clearance to oil passage 171 (primary-pulley cylinder chamber 30c), and thereby the relation Pp=Pp0 (Ip=Ip0) is achieved. A working fluid quantity necessary for supplying at this time is denoted by Q.

Supply quantity Q is proportional to a cross-sectional area S of the supply path (above-mentioned clearance). In other words, supply quantity Q is inversely proportional to the oil-passage resistance. Moreover, supply quantity Q is more increased as the differential pressure $\Delta p$ (=PL-Pp) between a supply source (oil passage 107 for PL) and a supply object (oil passage 171 for Pp) becomes larger. In other words, when trying to secure supply quantity Q by producing a flow of working fluid from oil passage 107 toward oil passage 171, larger differential pressure $\Delta p$ is necessary as cross-sectional area S of the above-mentioned clearance becomes smaller (the oil-passage resistance becomes higher). Hence, if the state where line pressure PL is somewhat higher than primary pressure Pp is not realized immediately before transmission ratio Ip becomes equal to target transmission ratio Ip0; differential pressure $\Delta p$ cannot be obtained, and the relation Ip=Ip0 is not achieved.

As mentioned above, in the first and second embodiments, shift control valve 170 closes with the above-mentioned differential pressure $\Delta p$ maintained, when transmission ratio Ip becomes equal to target transmission ratio Ip0 by means of the Ip feedback control for PL (hereinafter, differential pressure $\Delta p$ is referred to as a pressure loss). Accordingly, there is a fear that line pressure PL cannot be lowered until completely becoming equal to primary pressure Pp (=Pp0). Therefore in the fourth embodiment, the communication between oil passage 107 and oil passage 171 is kept until the time point when transmission ratio Ip becomes equal to target transmission ratio Ip0 by adjusting the opening of shift control valve 170, during the Ip feedback control for PL. Thereby, the pressure loss (pressure drop) is reduced. The actual transmission ratio Ip, i.e., the rotational-speed ratio can be calculated based on detection values derived from a primary rotational-speed sensor and a secondary rotational-speed sensor, as discussed in the third embodiment.

[Configurations in Fourth Embodiment]

Configurations in the fourth embodiment are similar as the first embodiment (see e.g., FIGS. 1 and 2, and FIGS. 3 and 9 regarding the configurations of hydraulic circuit and control system).

A control for line pressure PL according to this fourth embodiment is similar as the first embodiment, except the point that step-motor command value Ip0step is offset or shifted to the High side at step S5 of FIG. 13 during the Ip feedback control for PL. The concrete explanations are as follows.

Figure 18:
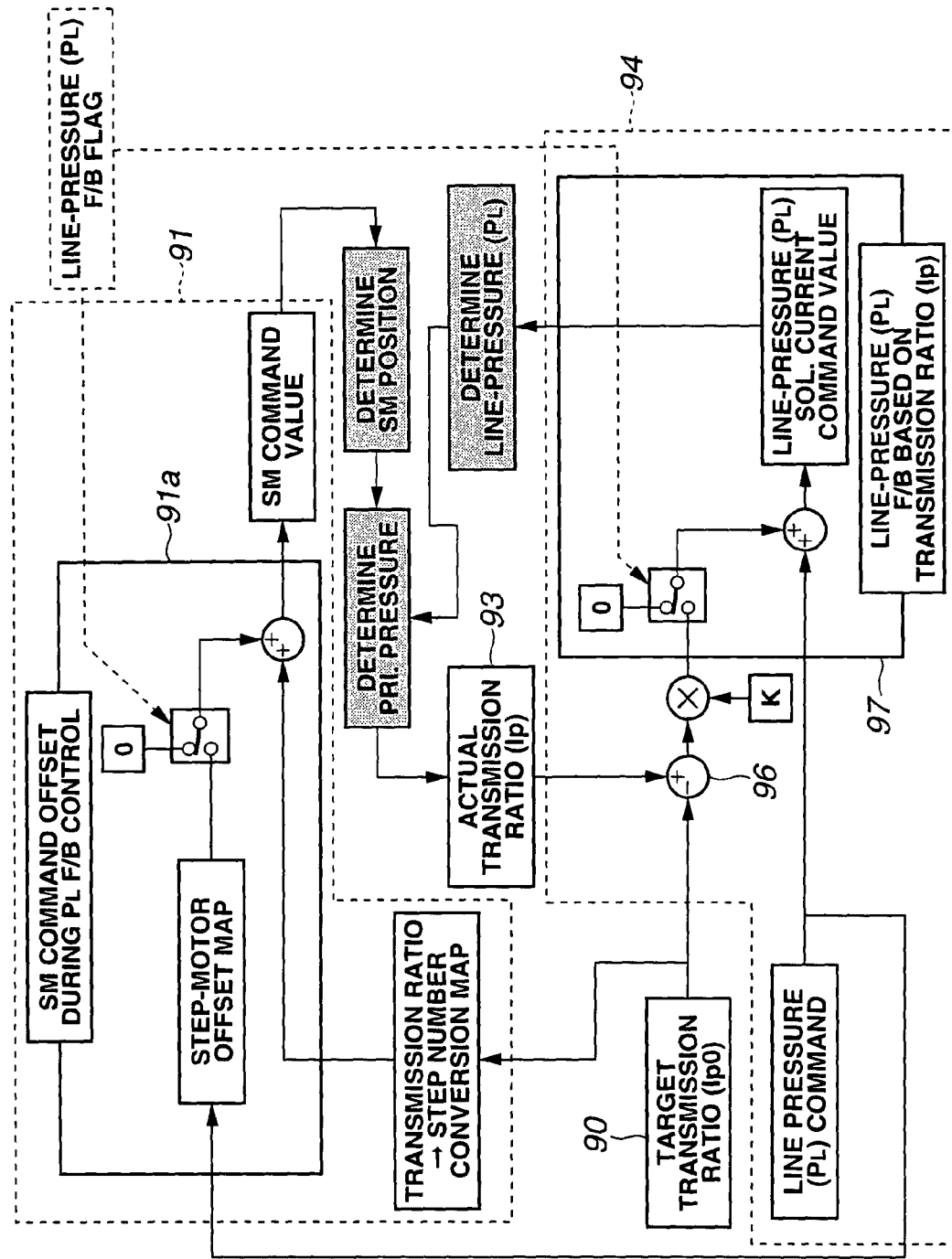
FIG. 18 is a control block diagram in the fourth embodiment.

FIG. 18 is a control block diagram according to the fourth embodiment. Primary-pressure adjusting section 91 includes an offset command section (or means) 91a, and the other control configurations are similar as the first embodiment. As mentioned above, PL F/B flag is set to 1 during the execution of the Ip feedback control for PL. Offset command section 91a adds an offset amount calculated based on an after-mentioned offset map, to step-motor command value Ip0step, when detecting that PL F/B flag is changed from 0 to 1. Thereby, offset command section 91a causes step-motor command value Ip0step to become offset to the High side. Primary-pressure adjusting section 91 outputs thus-offset (shifted) step-motor command value Ip0step to step motor 10.

The meaning of the above-mentioned "offset to the High side" is now described. The above-mentioned offset is an offset toward the side for more expanding the groove width of primary pulley 30 by supplying hydraulic pressure to oil passage 171, and therefore is expressed by "offset to the High side". Note that when PL reducing control is not being carried out under the condition PL>Pp, target transmission ratio Ip0 is achieved by the mechanical feedback. At this time, target transmission ratio Ip0 is achieved based on step-motor command value Ip0step set by primary-pressure adjusting section 91. Hence if adding a predetermined offset amount to step-motor command value Ip0step, target transmission ratio Ip0 is actually made offset (shifted) to the High side by the mechanical feedback. On the other hand, when PL reducing control is being carried out under the condition PL=Pp, target transmission ratio Ip0 is achieved by the Ip feedback control for PL but not by the mechanical feedback. Accordingly, target transmission ratio Ip0 is not actually offset to the High side by adding the offset amount to step-motor command value Ip0step.

Figure 19A:
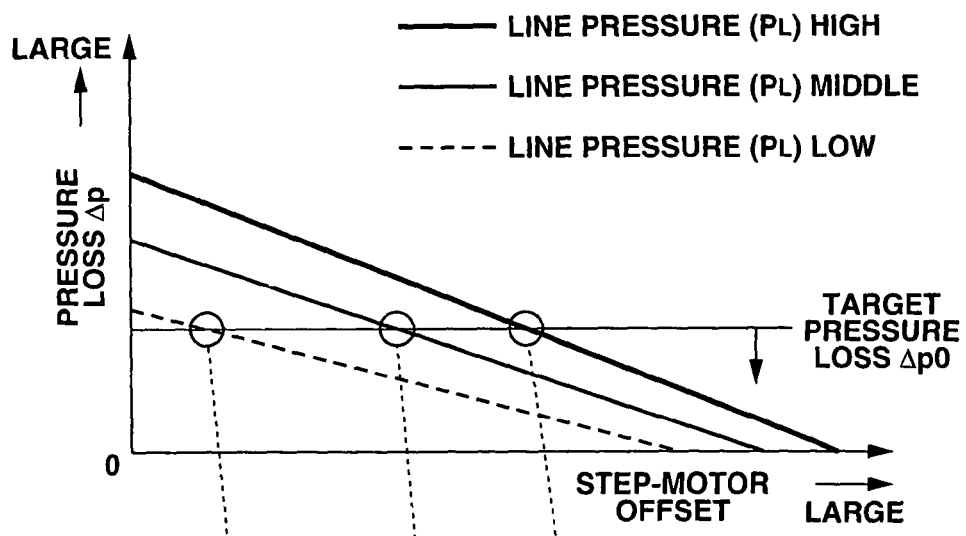
FIGS. 19A and 19B are offset maps in the fourth embodiment.
Figure 19B:
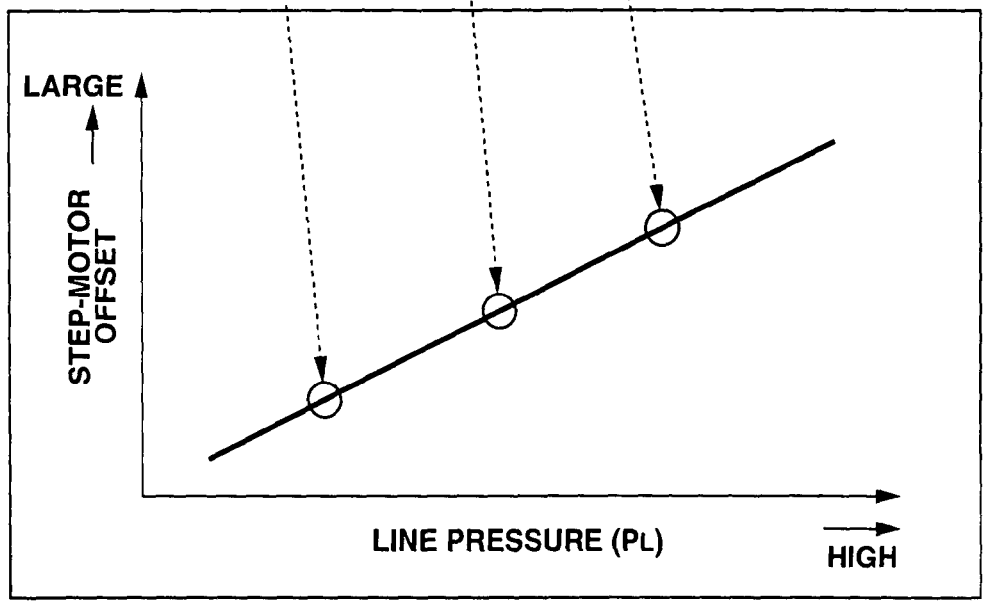

FIG. 19B is an offset map for use of the calculation for the offset amount. As shown in FIG. 19A, (1) in the case where a predetermined line pressure PL is given (fixed); pressure loss $\Delta p$ decreases more as the offset for command value Ip0step for being outputted to step motor 10 becomes larger. Moreover, (2) in the case where a predetermined offset is given (fixed); pressure loss $\Delta p$ decreases more as the line pressure PL becomes lower. In other words in this case, pressure loss $\Delta p$ increases more as the line pressure PL becomes higher. The reason for (2) is that differential pressure (pressure loss) $\Delta p$ between oil passage 107 (PL) and oil passage 171 (Pp) increases more as line pressure PL becomes high. From the above-mentioned (1) and (2), the offset amount to be should given in response to line pressure PL is determined when a predetermined pressure-loss target $\Delta p0$ (an allowable upper limit value of pressure loss $\Delta p$) is set. The offset map of FIG. 19B shows this relationship.

This offset map shows an offset amount which should be provided (given) according to line pressure PL, in the case where a predetermined pressure-loss target $\Delta p0$ is given. This map is set to allow the offset amount to increase in accordance with the increase of line pressure PL. This line pressure PL determining the offset amount denotes a value of line pressure PL (=PL*) at the time of start of the Ip feedback control for PL. Moreover, this offset amount corresponds to the opening of shift control valve 170 in the proximity of the time point when transmission ratio Ip returns to target transmission ratio Ip0 during the Ip feedback control for PL (i.e., just when or immediately before the relation Ip=Ip0 is established). Namely, this offset amount corresponds to cross-sectional area S of the clearance through which oil passage 107 communicates with oil passage 171, in the proximity of that time point.

[Operations in Fourth Embodiment]

Referring to FIG. 14, operations according to the above-mentioned offset will now be explained. When adding the offset amount to step-motor command value Ip0step during the Ip feedback control for PL; first rod 194 which is driven by step motor 10 is placed in a position shifted from a position corresponding to Ip0step in the positive direction of the X-axis by the degree of added offset amount. On the other hand, the position of primary movable pulley 30a when Ip becomes equal to Ip0 is constant regardless of the presence or absence of the offset for Ip0step.

Accordingly, in the proximity of the time point when transmission ratio Ip returns to target transmission ratio Ip0, land portion 173a of spool 173 is eccentric from the position for completely shutting off Pp supplying port 174 by the degree of offset amount in the positive direction of X-axis. Namely, shift control valve 170 does not completely shut off (stop) the communication between oil passage 107 and oil passage 171 during the Ip feedback control for PL. Thereby, oil passage 107 is always in communication with oil passage 171. Accordingly, the relation PL=Pp is satisfied always during the Ip feedback control for PL, and hence primary pressure Pp is determined at the same time as the determination of line pressure PL. So as to cause this pressure PL=Pp to become equal to target pressure Pp0, line pressure PL is controlled by way of feedback control while monitoring transmission ratio Ip.

In the case where the opening of shift control valve 170, namely cross-sectional area S of the clearance through which oil passage 107 communicates with oil passage 171 is relatively large; predetermined oil quantity Q necessary to supply through the above-mentioned clearance to oil passage 171 is secured even if differential pressure Δp between oil passage 107 (PL) and oil passage 171 (Pp) is small. The offset amount for Ip0step which is set based on the offset map of FIG. 19B corresponds to the above-mentioned cross-sectional area S in the proximity of the time point when transmission ratio Ip returns to target transmission ratio Ip0 during the Ip feedback control for PL. Namely, the offset amount (=cross-sectional area S) is set so as to become larger as line pressure PL becomes high. Therefore, even in the case where line pressure PL is relatively high; cross-sectional area S becomes large by that much, and hence differential pressure (pressure loss) Δp at the time of above-mentioned return becomes small.

By so-doing, while satisfying the relation PL=Pp always during the Ip feedback control for PL, the relation PL=Pp can be achieved by lowering differential pressure Δp also when transmission ratio Ip becomes equal to target transmission ratio Ip0. Namely, line pressure PL can be reduced completely up to primary pressure Pp (=Pp0) while achieving the relation Ip=Ip0.

When the Ip feedback control for PL is finished; line pressure PL is set to the value calculated by adding margin pressure β (>0) to target primary pressure Pp0, and the offset amount for Ip0step is set to 0. Then, the relation Ip=Ip0 is achieved by activating the mechanical feedback mechanism. The variation of primary pressure Pp at the time of this control switching can be suppressed to the minimum by adjusting the gradient in increasing line pressure PL while relating the gradient to a feed speed of step motor 10.

Configurations in the second embodiment may be applied to this fourth embodiment. Namely, after correcting step-motor command value Ipstep to satisfy the relation Ip=Ip0 (S12 to S14 of FIG. 15), the (thus-corrected) command value Ipstep may be made offset (shifted) during the Ip feedback control for PL (S17 of FIG. 15) in the similar manner as the fourth embodiment. In this case, the control accuracy of this fourth embodiment can be enhanced in the similar manner as the second embodiment.

[Structures and Effects according to Fourth Embodiment]

(1) In the hydraulic control apparatus according to the fourth embodiment, primary-pressure adjusting section 91 is configured to allow oil passage 82 to communicate with oil passage 184 by giving an offset to the opening of shift control valve 170 while the transmission-ratio feedback control for line pressure PL is being carried out.

According to the above structure; while line pressure PL is equal to primary pressure Pp always during the Ip feedback control for PL, the relation PL=Pp can be achieved by reducing pressure loss Δp also when transmission ratio Ip becomes equal to target transmission ratio Ip0 (i.e., at the time of closed point of shift control valve 170). Namely, line pressure PL can be reduced until completely becoming equal to primary pressure Pp (=Pp0) while achieving the relation Ip=Ip0. Therefore, the fuel economy can be more improved.

(2) Further, primary-pressure adjusting section 91 is configured to determine an amount of the above-mentioned offset in accordance with the level of line pressure PL at the start time of the transmission-ratio feedback control.

Namely, the offset amount for Ip0step which is based on the offset map of FIG. 19B is set so as to increase in response to the increase of line pressure PL. This offset amount corresponds to the above-mentioned opening of shift control valve 170 (cross-sectional area S) in the proximity of the time point when transmission ratio Ip returns to target transmission ratio Ip0 during the Ip feedback control for PL (at the time of closed point of shift control valve 170). Accordingly, even in the case where line pressure PL is relatively high; cross-sectional area S becomes large by just that much, and hence differential pressure (pressure loss) Δp at the time of above-mentioned return becomes small. Therefore, pressure loss Δp can be effectively reduced, and the fuel economy is more improved.

Fifth Embodiment

A hydraulic control apparatus in a fifth embodiment according to the present invention is applied to the step-motor type control. In the similar manner as the first, second, and fourth embodiments, line pressure PL is reduced up to primary pressure Pp by way of feedback control on the basis of the difference between the corresponding value of Ip and the corresponding value of Ip0 at the time of vehicle running under the overdrive. However unlike the first, second, and fourth embodiments; the hydraulic control apparatus in the fifth embodiment carries out the control for PL during the execution of shift, not under the state of constant running. Then in the similar manner as the fourth embodiment, line pressure PL is caused to become equal to primary pressure Pp by giving the offset to step-motor command value Ipstep. Then, line pressure PL is controlled by way of feedback to obtain desired transmission ratio Ip0 and a desired shift speed dIp0/dt.

[Configurations in Fifth Embodiment]

Configurations in the fifth embodiment are similar as the first embodiment (see e.g., FIGS. 1 and 2, and FIGS. 3 and 9 regarding the configurations of hydraulic circuit and control system).

Figure 20:
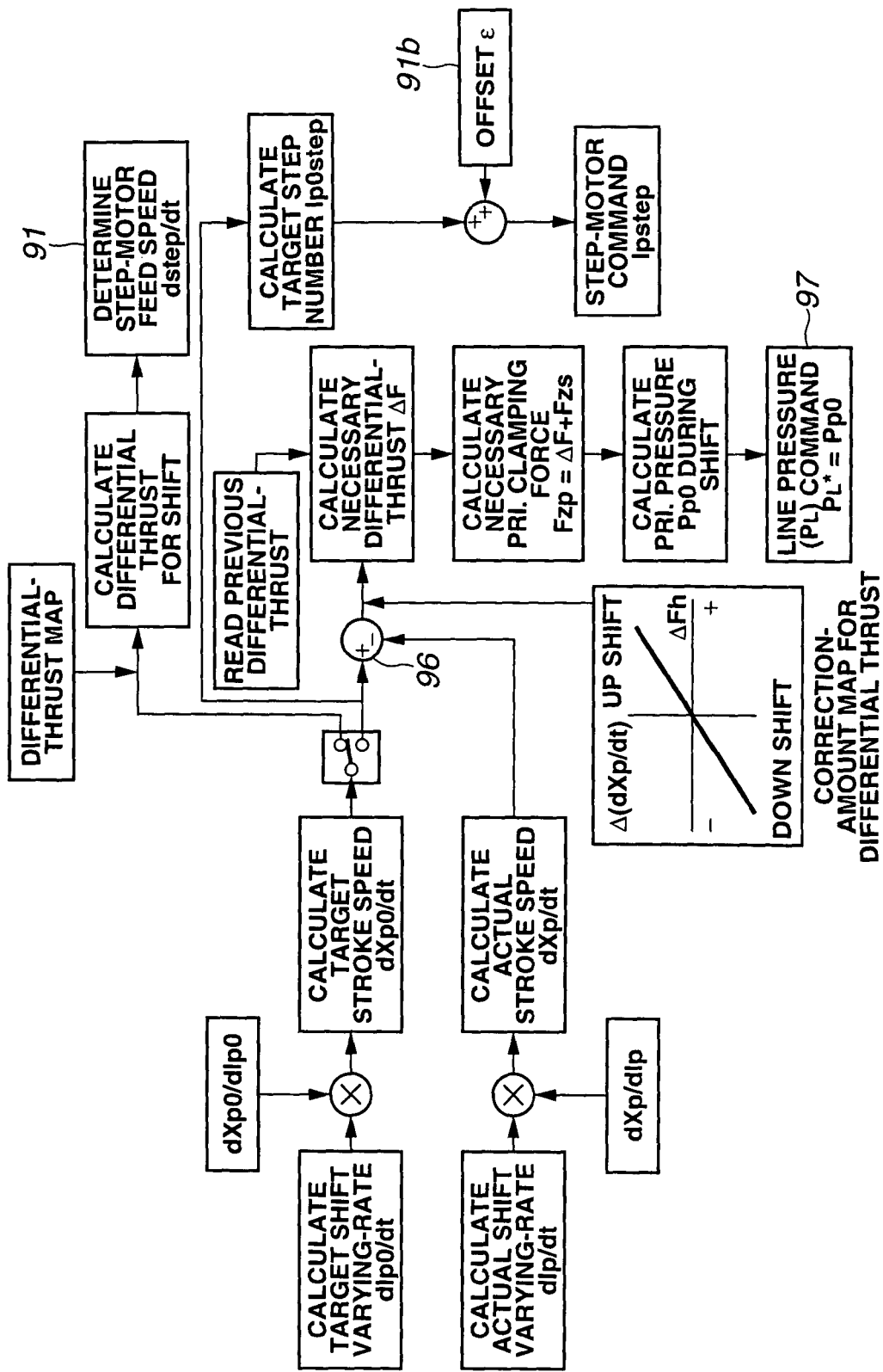
FIG. 20 is a control block diagram in a fifth embodiment.

FIG. 20 is a control block diagram according to the fifth embodiment. In the case where the control according to this fifth embodiment is not carried out; primary-pressure adjusting section 91 outputs step-motor command value Ip0step based on a predetermined step-motor feed speed dstep/dt, to step motor 10. Responding to this, the mechanical feedback mechanism is activated, and thereby varies target primary pressure Pp0 at a desired variation rate (speed) so that the shift is carried out.

Step-motor feed speed dstep/dt, namely a driving amount (rotational step number) of step motor 10 per unit time is determined as follows. At first, target shift-varying-rate dIp0/dt is calculated from ever-varying target transmission ratio Ip0. Moreover, a stroke amount Xp0 of primary movable pulley 30a per unit Ip0, namely dXp0/dIp0 is calculated.

Then, this calculated dXp0/dIp0 is multiplied by dIp0/dt, to calculate a target stroke speed dXp0/dt of primary movable pulley 30a.

Then, a differential thrust ΔF (=Fzp−Fzs) which is the difference between pulley thrusts Fzp and Fzs necessary for the shift is calculated referring to a predetermined differential-thrust map on the basis of target stroke speed dXp0/dt. In this differential-thrust map, differential thrust ΔF is set to be proportional to dXp/dt (same characteristic as an after-mentioned differential-thrust correction-amount map). Based on thus-calculated differential thrust ΔF, step-motor feed speed dstep/dt is determined.

In the fifth embodiment, primary-pressure adjusting section 91 includes an offset command section (or means) 91b. Offset command section 91b adds a predetermined offset amount ε to step-motor command value Ip0step, so that step-motor command value Ipstep becomes offset (shifted) to the High side. On the other hand, line-pressure control section 94 carries out the PL reducing control for causing line-pressure command pressure PL*(=PL) to become equal to target primary pressure Pp0 during the shift, by correcting line-pressure command pressure PL* by way of feedback correction as mentioned below.

At first, an actual shift varying-rate (shift speed) dIp/dt is calculated from transmission ratio Ip sensed by actual transmission-ratio sensing section 93. The actual transmission ratio Ip, i.e., the rotational-speed ratio can be calculated based on detection values derived from a primary rotational-speed sensor and a secondary rotational-speed sensor, as discussed in the third embodiment. Moreover, actual stroke amount Xp of primary movable pulley 30a per unit Ip, namely dXp/dIp is calculated. Then, this calculated dXp/dIp is multiplied by dIp/dt, to calculate actual stroke speed dXp/dt of primary movable pulley 30a. Comparing section 96 compares dXp0/dt with dXp/dt, and calculates its deviation Δ(dXp/dt).

Line-pressure adjusting section 97 sets command pressure PL* during the shift, as mentioned below. At first, line-pressure adjusting section 97 calculates a correction amount ΔFh for differential thrust ΔF necessary for the shift, on the basis of Δ(dXp/dt) by using the differential-thrust correction-amount map shown in FIG. 20. In this map, correction amount ΔFh is set to be proportional to Δ(dXp/dt). Line-pressure adjusting section 97 reads a previous (last-time around) value ΔF(n−1) of differential thrust ΔF, and then calculates a this-time around value ΔF(n) of differential thrust ΔF by adding correction amount ΔFh to previous value ΔF(n−1). Moreover, primary thrust Fzp necessary for the shift is calculated based on differential thrust ΔF thus-corrected by feedback correction, from the formula: Fzp=ΔF+Fzs. Line-pressure adjusting section 97 calculates target primary pressure Pp0 necessary for the shift by converting this primary thrust Fzp into its hydraulic-pressure value, and sets command pressure PL* to target primary pressure Pp0 calculated as above.

[Operations according to Fifth Embodiment]
(Control Flowchart)

Figure 21:
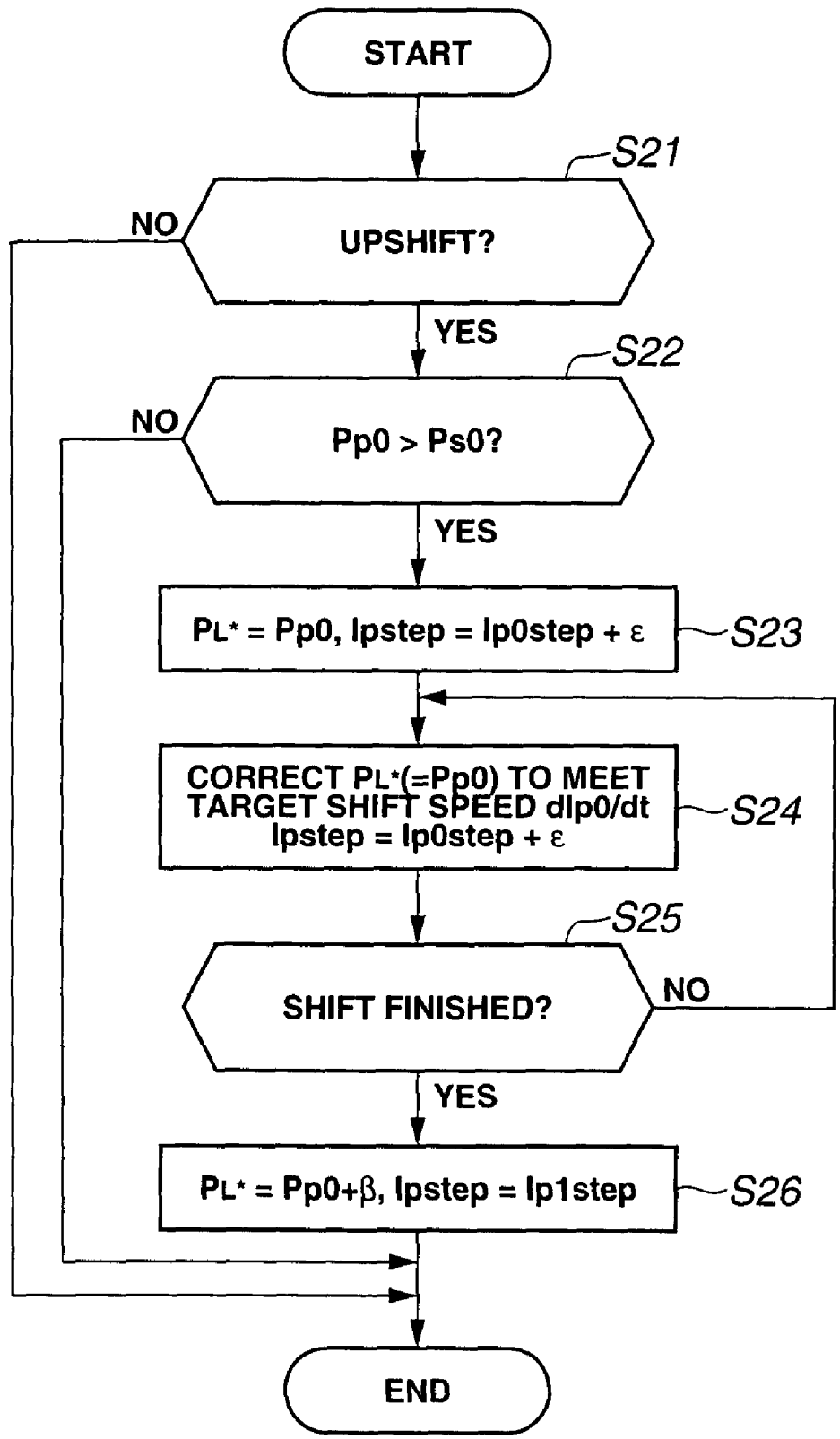
FIG. 21 is a control flowchart in the fifth embodiment.

FIG. 21 is a flowchart showing the control for line pressure PL during the shift. At step S21, it is judged whether or not the shift is upshift. If it is determined that the shift is upshift, namely the answer of step S21 is Yes; the program proceeds to step S22. If it is determined that the shift is downshift, namely the answer of step S21 is No; this line pressure control finishes. At step S22, it is judged whether or not the relation Pp0>Ps0 is satisfied. If Pp0>Ps0, namely the answer of step S22 is Yes; the program proceeds to step S23. If Pp0≦Ps0, namely the answer of step S22 is No; this line pressure control finishes.

At step S23, command pressure PL* is set to target primary pressure Pp0. Moreover, step-motor command value Ipstep is made offset from Ip0step to the High side by offset amount ε (Ipstep=Ip0step+ε). Then, the program proceeds to step S24. At step S24, command pressure PL*(=Pp0) is corrected by setting PL* based on ΔF corrected by feedback correction. Moreover, step-motor command value Ipstep (=Ip0step) is made offset by offset amount ε (Ipstep=Ip0step+ε). This step S24 is repeated until Ip0 accords with Ip1 which is a steady-state transmission ratio after the shift, namely until the shift finishes (step S25).

At step S25, constant-running judging section 95 judges whether or not transmission ratio Ip0 reaches post-shift transmission ratio Ip1 and becomes in a stable state at Ip1, namely whether or not the shift becomes in a finished state. If constant-running judging section 95 determines that the shift is in the finished state, the program proceeds to step S26. At step S26, command pressure PL* is set equal to Pp0+β, and step-motor command value Ipstep is made equal to Ip1step (Ipstep=Ip1step) so that the offset amount becomes equal to 0.

(Timing Chart)

Figure 22:
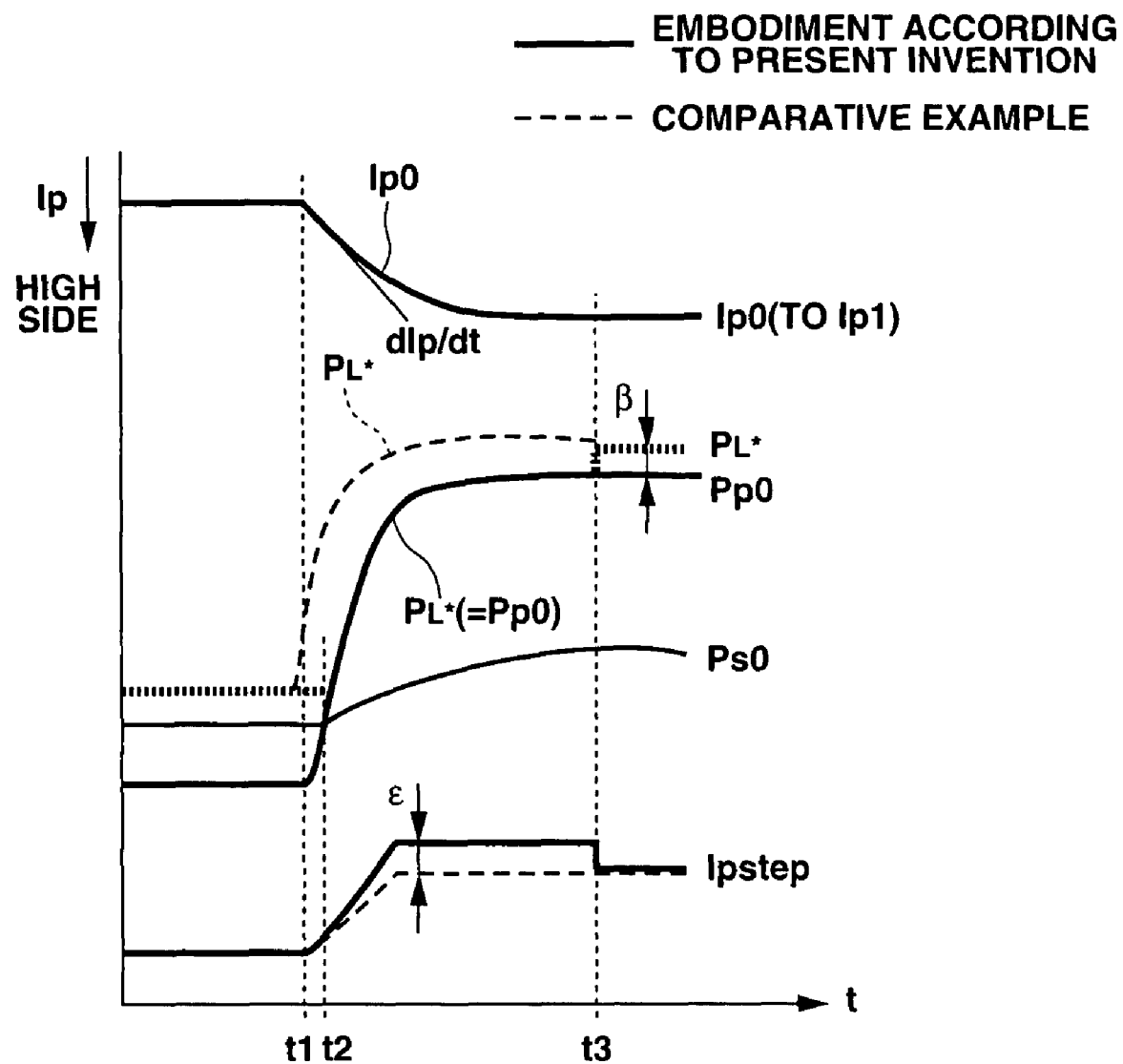
FIG. 22 is a timing chart in the control according to fifth embodiment.

FIG. 22 is a timing chart showing time changes of Ip0, PL*, Pp0, Ps0, and Ipstep between before and after the upshift. In FIG. 22, the control according to this fifth embodiment is shown by solid lines, and a comparative example not employing the control of this fifth embodiment is shown by dotted lines. Note that Ip0=Ip, PL*=PL, Pp0=Pp, and Ps0=Ps are supposed. The following explanations refer to FIGS. 5 and 22.

At time point t1, Ip0 starts to vary to the High side, and the upshift is started. After time point t1, actual shift varying-rate dIp/dt and actual stroke speed dXp/dt are calculated. At time point t2, the magnitude relation between Pp0 and Ps0 is reversed to satisfy Pp0>Ps0. Namely, after time point t2, Ip's region capable of reducing PL* up to Pp0 as described above (see FIG. 12) is realized. Hence, the PL reducing control (S23-S25) is started.

Ipstep is made offset from Ip0step to the High side by ε (S23). Thereby, spool 173 of shift control valve 170 deviates from the neutral position for achieving the relation Ip=Ip0 as shown in FIG. 5 in the positive direction of the X-axis by an amount corresponding to offset amount ε. Namely, oil passage 107 is made to communicate with oil passage 171 by opening shift control valve 170. Accordingly, PL becomes equal to Pp, and afterward in the similar manner as fourth embodiment, Pp is controlled by controlling PL (=PL*), not by the mechanical feedback. In other words, the relation Ip=IP0 is achieved during the shift by controlling PL*(=Pp) to become equal to Pp0. Therefore, Ipstep is made offset, and PL* is set at Pp0 (S23).

Until time point t3 when the shift finishes, the above-mentioned PL*(=Pp0) set for achieving target shift speed dIp0/dt is corrected (S24). Namely, Pp0 is the primary pressure necessary during the shift, and is synonymous with differential thrust ΔF (Fzp for producing ΔF) necessary to achieve the desired shift speed. Fzp is calculated based on target shift varying-rate dIp0/dt. Hence, target transmission ratio Ip0 during the execution of shift is achieved at target shift speed dIp0/dt since Pp0=PL*. Moreover, Fzp (Pp0) is corrected by feedback on the basis of the difference between dXp/dt (Ip corresponding value) calculated based on Ip and dXp0/dt (Ip0 corresponding value) calculated based on Ip0. In other words, PL* is corrected by feedback on the basis of the sensed Ip, to cause target transmission ratio Ip0 during the shift to be reliably achieved at target shift speed dIp0/dt.

Between time points t2 and t3, Ipstep is maintained offset from Ip0step to the High side by ε (S24). Thereby, the relation PL=Pp is secured since shift control valve 170 is open during the above-mentioned feedback control for PL* to maintain the communication between oil passage 107 and oil passage 171.

Namely, while performing the PL reducing control for bringing PL* (=PL) equal to Pp0 necessary during the shift, primary movable pulley 30a moves in the negative direction of X-axis of FIG. 5 because of the upshift. On the other hand, first rod 194 is moved in the positive direction of X-axis to cancel the movement amount of primary movable pulley 30a, by outputting Ip0step for upshift to step motor 10. Accordingly, spool 173 of shift control valve 170 is kept in a substantially constant position during the shift. Since Ipstep is offset to the High side (S24) by adding predetermined offset amount ε to Ipstep (=Ip0step), spool 173 is maintained during the shift in a position for allowing oil passage 107 to communicate with oil passage 171.

At time point t3, Ip0 becomes stable at predetermined transmission ratio Ip1, and it is determined that the shift finishes (S25). Hence, the above-mentioned feedback control for PL* is finished, and PL* is set equal to Pp0+β (β>0) by resetting to switch from the feedback control for PL* to the open control for PL*. At the same time, Ipstep is set at Ip1step corresponding to Ip1 so that the offset amount ε returns to 0, and the mechanical feedback mechanism is activated (S26). In the similar manner as the fourth embodiment, the variation of Pp at the time of this control switching can be suppressed to the minimum by adjusting the gradient in increasing line pressure PL while relating this gradient to the feed speed of step motor 10.

(Operations and Effects according to Fifth Embodiment by contrast with Comparative Example)

In the case where the above-mentioned PL reducing control is not carried out as shown by dotted lines in FIG. 22, PL (=PL*) is maintained at high values obtainable by adding margin pressure β (>0) to Pp (=Pp0) between time points t1 and t3 during the shift. Hence between these time points, the pumping loss for maintaining PL high is caused, and therefore the fuel economy cannot be improved. Compared with this, in the fifth embodiment, the PL reducing control for reducing PL up to Pp is carried out in the region of transmission ratio (after time point t2) during which there is no fear that the belt slip is caused. Therefore, the fuel economy can be improved by eliminating or minifying the pumping loss during the shift.

In this fifth embodiment, the above-mentioned control for reducing PL up to Pp0 is carried out when the relation Pp0>Ps0 is satisfied. In the case where the PL reducing control starts when Ps0 is relatively high (the region of Ip between A and 1 in FIG. 12), it is conceivable that the probability of occurrence of the belt slip is relatively high because the difference between PL and Ps0 is small. However, since the PL reducing control is carried out in the case of upshift, Ip varies to the overdrive side after starting this control, and the difference between PL and Ps0 becomes greater. Accordingly, there is no fear of the belt slip. Moreover, the PL reducing control may be started when Ip is in the overdrive side beyond 1.

Further in this fifth embodiment, the PL reducing control is carried out at the time of upshift. However, the above-mentioned PL reducing control may be carried out at the time of downshift as far as the shift is carried out in the overdrive-side region satisfying Pp0>Ps0 (or in the overdrive side of Ip beyond 1). This is because there is no fear of occurrence of the belt slip in the range sufficiently securing the difference between PL and Ps0.

Further in this fifth embodiment, the PL reducing control is applied to the step-motor type control. However, the PL reducing control of this fifth embodiment may be applied to the direct-acting type control including the structure similar as the third embodiment. In this case, for example, Pp* may be set at maximum pressure command Pp*max during the execution of PL reducing control, instead of causing Ip0step to become offset to the High side as the above-mentioned fifth embodiment. Thereby, the opening of PRI.V 180 becomes its maximum, and PL becomes equal to Pp.

Further, the structure of second embodiment may be applied to the fifth embodiment. Namely, after correcting Ipstep to satisfy the relation Ip=Ip0 under a constant running before starting the shift (S11 to S14 in FIG. 15), the corrected Ipstep may be made offset after starting the PL reducing control in the similar manner as the fifth embodiment. In this case, the control accuracy of fifth embodiment can be enhanced in the same manner as the second embodiment.

[Structures and Effects according to Fifth Embodiment]

(1) In the hydraulic control apparatus according to the fifth embodiment, line-pressure control section 94 adjusts line pressure PL to the value set by adding margin pressure α or β to higher one of primary pressure Pp and secondary pressure Ps during the shift. Then, line-pressure control section 94 reduces margin pressure β when primary pressure Pp is higher than secondary pressure Ps (or, when transmission ratio Ip is in the overdrive side smaller than 1). Namely, line pressure PL which has been adjusted to the value set by adding margin pressure β (>0) to Pp during no execution of the shift is lowered by bringing margin pressure β to 0 during the execution of the shift.

According to the above structure; the fuel economy can be more improved by lowering the difference between PL and Pp during the shift and thereby reducing the pumping loss, under the overdrive running during which PL affords to be reduced without producing the fear of belt slip.

(2) In the hydraulic control apparatus according to the fifth embodiment, the above-mentioned shift is an upshift.

According to this structure; since the PL reducing control is carried out at the time of upshift, Ip varies to the overdrive side after starting the PL reducing control, and the difference between PL and Ps0 becomes larger, even in the case where the PL reducing control starts when the difference between PL and Ps0 is small. Accordingly, the fuel economy can be improved by eliminating or reducing the pumping loss also during the execution of shift while reliably preventing the belt slip.

(3) In the hydraulic control apparatus according to the fifth embodiment, the primary pressure control section (primary-pressure adjusting section 91 and the mechanical feedback mechanism) includes shift control valve 170 adapted to adjust (open and close) the communication between line-pressure-supplying oil passage 107 and oil passage 171 for supplying primary pressure Pp to primary pulley 30. Then, the primary pressure control section adjusts primary pressure Pp to its value Pp0 for achieving target transmission ratio Ip0 by controlling the opening of shift control valve 170, and causes oil passage 107 to communicate with oil passage 171 during the PL reducing control by giving the offset to the opening of shift control valve 170. At this time, a line-pressure control subsection (step S24) of line-pressure control section 94 adjusts line pressure PL so as to bring line pressure PL to target primary pressure Pp0 during the shift. Moreover, the above-mentioned primary pressure control section can employ the mechanical feedback mechanism including step motor 10 adapted to output the rotational step number according to target transmission ratio Ip0, and the link mechanism adapted to provide the opening of shift control valve 170 in accordance with the rotational step number and the groove width of primary pulley 30. The mechanical feedback mechanism is adapted to adjust primary pressure Pp to bring the groove width of primary pulley 30 to its value for achieving target transmission ratio Ip0.

Namely in the step-motor type control, the mechanical feedback is conducted without monitoring PL on the assumption that PL is higher than Pp. Accordingly, the mechanical feedback becomes incapable of controlling the shift if PL becomes equal to Pp0 during the shift. Hence, there has been a limitation that PL cannot be reduced up to Pp while maintaining Ip at Ip0 during the shift. On the other hand, the hydraulic control apparatus in the fifth embodiment causes Pp to become equal to PL by giving the offset to the opening of shift control valve 170, and then adjusts PL (=Pp) during the shift by way of feedback control instead of the mechanical feedback for Pp. Accordingly, PL can be reduced up to Pp while maintaining the desired shift speed, and can be set at its minimum necessary hydraulic pressure (level). Therefore, there is an advantage that the fuel economy can be more improved by reducing the difference between PL and Pp under the state of overdrive and thereby reducing the pumping loss in the step-motor type hydraulic control apparatus for CVT.

Other Embodiments

Although the invention has been described above with reference to certain embodiments (first to fifth) of the invention, the invention is not limited to the embodiments described above. Modifications and variations of the embodiments described above will occur to those skilled in the art in light of the above teachings.

For example in the first embodiment and the like, the transmission ratio (speed ratio) sensor for sensing the groove width of primary pulley is fixed at the outer-diameter end of the primary movable pulley, and is used as means for sensing the transmission ratio. However, the transmission ratio may be calculated, by providing the primary rotational-speed sensor and the secondary rotational-speed sensor as in the third embodiment and by using a ratio between rotational speeds sensed by these speed sensors.

In the Ip feedback control for line pressure PL according to the first embodiment and the like, the case is conceivable that a self-excited oscillation of system occurs due to a delay in responsiveness of mechanical feedback mechanism against the hydraulic command for line pressure PL. In such case, an inverse function of a transfer function corresponding to the mechanical feedback mechanism may be applied to the Ip feedback control law for line pressure PL so as to correct the above-mentioned disparity (delay) of responsiveness.

In the third embodiment, the control is switched from the normal Pp control into the Ip feedback control for PL, when becoming incapable of maintaining the relation Ip=Ip0 during the process of reducing the line pressure PL (S4 in FIG. 13). However, the control may be switched when pressure Pp sensed by primary pressure sensor 40 becomes lower than target pressure Pp0. Namely, by sensing the condition where primary pressure Pp has become lower than target pressure Pp0 during the process of reducing the line pressure PL; the condition can be guessed (judged) where line pressure PL has become equal to pressure Pp, and line pressure PL (=Pp) has become lower than target pressure Pp0. This is because it is conceivable that the opening of line-pressure supplying port 181 reaches its maximum by means of the feedback adjustment of PRI.V 180 and line pressure PL becomes equal to pressure Pp in the middle of reducing line pressure PL. Therefore, the criterion time point for switching the control in step S4 of the third embodiment may employ a time point when pressure Pp sensed by primary pressure sensor 40 becomes lower than target pressure Pp0.

Further in the third embodiment, hydraulic control valve PRI.V 180 whose opening (degree) is controlled by the signal pressure outputted according to Ip0 is used as the control valve for adjusting primary pressure Pp. However, an electronic control valve whose opening is adapted to be directly controlled by electromagnetic force of a solenoid may be used as the control valve for adjusting primary pressure Pp. Moreover in the first, second, fourth, and fifth embodiments, the mechanical feedback mechanism is used as the mechanism for adjusting primary pressure Pp. However in place of this, the above-mentioned electronic control valve may be used. This type of electronic control valve has the similar structure as the mechanical feedback mechanism adapted to close the communication between the line-pressure-supplying oil passage and the primary-pressure-supplying oil passage more narrowly as Ip becomes closer to Ip0 (Pp becomes closer to Pp0). Hence, it is conceivable that this type of electronic control valve can be used instead of the step-motor system. Therefore, in the case where the hydraulic control apparatuses according to the first, second, fourth, and fifth embodiments are applied to a direct-acting type control using the above-mentioned electronic control valve; the similar operations and effects as these embodiments can be obtained.

This application is based on prior Japanese Patent Applications No. 2006-074960 filed on Mar. 17, 2006 and No. 2007-032819 filed on Feb. 14, 2007. The entire contents of these Japanese Patent Applications are hereby incorporated by reference.

The scope of the invention is defined with reference to the following claims.

What is claimed is:
1. A hydraulic control apparatus comprising:
a continuously-variable transmission including
a pair of drive pulleys including a first movable pulley and a first fixed pulley,
a pair of driven pulleys including a second movable pulley and a second fixed pulley, and
a belt wound between the pair of drive pulleys and the pair of driven pulleys, the continuously-variable transmission being adapted to be continuously shifted by moving at least one of the first movable pulley and the second movable pulley by means of hydraulic pressure and thereby varying at least one of a groove width between the pair of drive pulleys and a groove width between the pair of driven pulleys to vary a winding radius of the belt;
a line-pressure control section configured to produce a line pressure by adjusting a discharge pressure of an oil pump;
a first hydraulic-pressure control section configured to adjust a first hydraulic pressure based on the line pressure, the first hydraulic pressure being supplied to the drive pulleys; and
a second hydraulic-pressure control section configured to adjust a second hydraulic pressure based on the line pressure, the second hydraulic pressure being supplied to the driven pulleys, wherein the line-pressure control section is configured:
to adjust the line pressure to a value set by adding a margin pressure to higher one of the first hydraulic pressure and the second hydraulic pressure, and
to set the margin pressure lower when the first hydraulic pressure is higher than the second hydraulic pressure.

2. The hydraulic control apparatus as claimed in claim 1, wherein
the line-pressure control section is configured to reduce the margin pressure when a transmission ratio calculated by dividing the belt winding radius of driven pulleys by the belt winding radius of drive pulleys is smaller than 1.

3. The hydraulic control apparatus as claimed in claim 1, wherein
the hydraulic control apparatus further comprises an actual transmission-ratio sensing section adapted to sense an actual transmission ratio;
the first hydraulic-pressure control section
includes a first control valve adapted to adjust a communication between a line-pressure supplying oil passage and a first-hydraulic-pressure supplying oil passage for supplying the first hydraulic pressure to the drive pulleys, and
is configured to adjust the first hydraulic pressure to its value for achieving a target transmission ratio by controlling an opening of the first control valve; and
the line-pressure control section is configured to carry out a transmission-ratio feedback control to adjust the line pressure so as to achieve the target transmission ratio on the basis of the sensed actual transmission ratio, after the first hydraulic-pressure control section becomes incapable of achieving the target transmission ratio due to the reduction of the line pressure adjusted to the value set by adding the margin pressure.

4. The hydraulic control apparatus as claimed in claim 3, wherein
the first hydraulic-pressure control section is configured to allow the line-pressure supplying oil passage to communicate with the first-hydraulic-pressure supplying oil passage by giving an offset to the opening of the first control valve while the transmission-ratio feedback control for line pressure is being carried out.

5. The hydraulic control apparatus as claimed in claim 4, wherein
the first hydraulic-pressure control section is configured to determine an amount of the offset in accordance with a level of the line pressure at the start time of the transmission-ratio feedback control.

6. The hydraulic control apparatus as claimed in claim 3, wherein
the first hydraulic-pressure control section is a mechanical feedback mechanism including
a drive source adapted to output a driving amount according to the target transmission ratio, and
a link adapted to provide the opening of the first control valve in accordance with the driving amount and the groove width between the drive pulleys; and
the mechanical feedback mechanism is adapted to adjust the first hydraulic pressure to bring the groove width between the drive pulleys to its value for achieving the target transmission ratio.

7. The hydraulic control apparatus as claimed in claim 6, wherein when the actual transmission ratio produced by the mechanical feedback mechanism has a deviation from the target transmission ratio,
the line-pressure control section is configured
to bring the actual transmission ratio substantially equal to the target transmission ratio by correcting the driving amount, then
to reduce the line pressure adjusted to the value set by adding the margin pressure, and then
to carry out the transmission-ratio feedback control for line pressure.

8. The hydraulic control apparatus as claimed in claim 3, wherein
the first control valve is an electronic control valve whose opening is directly controlled by electromagnetic force.

9. The hydraulic control apparatus as claimed in claim 3, wherein
the first control valve is a hydraulic control valve whose opening is controlled by a signal pressure outputted according to the target transmission ratio.

10. The hydraulic control apparatus as claimed in claim 9, wherein
the first hydraulic-pressure control section is configured to allow the line-pressure supplying oil passage to communicate with the first-hydraulic-pressure supplying oil passage by fixing the opening of the first control valve to its maximum during the transmission-ratio feedback control for line pressure.

11. The hydraulic control apparatus as claimed in claim 1, wherein
the line-pressure control section is configured to reduce the margin pressure when a vehicle is in a steady state where a transmission ratio is constant.

12. The hydraulic control apparatus as claimed in claim 1, wherein
the line-pressure control section is configured to reduce the margin pressure during a shift.

13. The hydraulic control apparatus as claimed in claim 12, wherein the shift is an upshift.

14. The hydraulic control apparatus as claimed in claim 12, wherein
the first hydraulic-pressure control section includes a first control valve adapted to adjust a communication between a line-pressure supplying oil passage and a first-hydraulic-pressure supplying oil passage for supplying the first hydraulic pressure to the drive pulleys;
the first hydraulic-pressure control section is configured
to adjust the first hydraulic pressure to its value for achieving a target transmission ratio by controlling an opening of the first control valve, and
to allow the line-pressure supplying oil passage to communicate with the first-hydraulic-pressure supplying oil passage by giving an offset to the opening of the first control valve, while the line-pressure control section is reducing the margin pressure; and
the line-pressure control section is configured to adjust the line pressure to bring the line pressure to a target value for first hydraulic pressure during the shift.

15. The hydraulic control apparatus as claimed in claim 12, wherein
the first hydraulic-pressure control section is a mechanical feedback mechanism including
a drive source adapted to output a driving amount according to a target transmission ratio, and
a link adapted to provide the opening of the first control valve in accordance with the driving amount and the groove width between the drive pulleys; and
the mechanical feedback mechanism is adapted to adjust the first hydraulic pressure to bring the groove width between the drive pulleys to its value for achieving the target transmission ratio.

16. The hydraulic control apparatus as claimed in claim 12, wherein the first control valve is an electronic control valve whose opening is directly controlled by electromagnetic force.

17. The hydraulic control apparatus as claimed in claim 12, wherein
the first control valve is a hydraulic control valve whose opening is controlled by a signal pressure outputted according to a target transmission ratio.

18. The hydraulic control apparatus as claimed in claim 17, wherein
the first hydraulic-pressure control section is configured to allow a line-pressure supplying oil passage to communicate with a first-hydraulic-pressure supplying oil passage by fixing the opening of the first control valve to its maximum, while the line-pressure control section is reducing the margin pressure.

19. A hydraulic control method for a continuously-variable transmission including
a pair of drive pulleys including a first movable pulley and a first fixed pulley,
a pair of driven pulleys including a second movable pulley and a second fixed pulley, and
a belt wound between the pair of drive pulleys and the pair of driven pulleys, the continuously-variable transmission being adapted to be continuously shifted by moving at least one of the first movable pulley and the second movable pulley by means of hydraulic pressure and thereby varying at least one of a groove width between the pair of drive pulleys and a groove width between the pair of driven pulleys,
the hydraulic control method comprising:
producing a line pressure by adjusting a discharge pressure of an oil pump so as to bring the line pressure to a value set by adding a margin pressure to higher one of a target first hydraulic pressure and a target second hydraulic pressure;
adjusting a first hydraulic pressure to the target first hydraulic pressure on the basis of the line pressure, the first hydraulic pressure being supplied to the drive pulleys;
adjusting a second hydraulic pressure to the target second hydraulic pressure on the basis of the line pressure, the second hydraulic pressure being supplied to the driven pulleys; and
setting the margin pressure lower when the first hydraulic pressure is higher than the second hydraulic pressure.

\* \* \* \* \*